US009092053B2

(12) United States Patent
Kerr et al.

(10) Patent No.: US 9,092,053 B2
(45) Date of Patent: Jul. 28, 2015

(54) SYSTEMS AND METHODS FOR ADJUSTING A DISPLAY BASED ON THE USER'S POSITION

(75) Inventors: Duncan R. Kerr, San Francisco, CA (US); Nicholas V. King, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1220 days.

(21) Appl. No.: 12/140,604

(22) Filed: Jun. 17, 2008

(65) Prior Publication Data

US 2009/0313584 A1    Dec. 17, 2009

(51) Int. Cl.
G06F 3/048     (2013.01)
G06F 3/01      (2006.01)
G06F 3/03      (2006.01)
G06F 3/0481    (2013.01)
G09G 3/00      (2006.01)
G09G 5/14      (2006.01)

(52) U.S. Cl.
CPC .............. *G06F 3/012* (2013.01); *G06F 3/0304* (2013.01); *G06F 3/04815* (2013.01); *G06F 2200/1637* (2013.01); *G09G 3/003* (2013.01); *G09G 5/14* (2013.01); *G09G 2340/04* (2013.01); *G09G 2354/00* (2013.01)

(58) Field of Classification Search
CPC .............. G06T 2219/028; G06T 19/00; G06T 2207/30201; G06T 2207/10016; G06T 7/2066; G06F 3/012; G06F 3/0304; G06F 3/0346; G06F 3/04815; G09G 5/14; H04N 13/0468
USPC .................. 715/848, 852, 782, 757, 836, 849
See application file for complete search history.

(56) References Cited

U.S. PATENT DOCUMENTS 5,574,836 A * 11/1996 Broemmelsiek .............. 345/427
5,786,846 A *  7/1998 Hiroaki ...................... 348/14.16
6,088,018 A    7/2000 DeLeeuw et al.
(Continued)

FOREIGN PATENT DOCUMENTS

EP         0874303 A1    10/1998
FR   EP 0 874 303 A1 * 10/1998 ................ G06F 3/00
WO       2006024873 A2     3/2006

OTHER PUBLICATIONS

WO2009154837 Systems and Methods for Adjusting a Display Based on the User's Position (Apple) Dec. 17, 2010.*
(Continued)

*Primary Examiner* — Amy M Levy
(74) *Attorney, Agent, or Firm* — Blank Rome LLP

(57) ABSTRACT

An electronic device for providing a display that changes based on the user's perspective is provided. The electronic device may include a sensing mechanism operative to detect the user's position relative a display of the electronic device. For example, the electronic device may include a camera operative to detect the position of the user's head. Using the detected position, the electronic device may be operative to transform displayed objects such that the displayed perspective reflects the detected position of the user. The electronic device may use any suitable approach for modifying a displayed object, including for example a parallax transform or a perspective transform. In some embodiments, the electronic device may overlay the environment detected by the sensing mechanism (e.g., by a camera) to provide a more realistic experience for the user (e.g., display a reflection of the image detected by the camera on reflective surfaces of a displayed object).

39 Claims, 25 Drawing Sheets

(56) References Cited

U.S. PATENT DOCUMENTS

| | | | |
|---|---|---|---|
| 6,323,846 B1 | 11/2001 | Westerman et al. | |
| 6,414,677 B1* | 7/2002 | Robertson et al. | 345/419 |
| 7,015,924 B2 | 3/2006 | Thomason | |
| 7,084,884 B1* | 8/2006 | Nelson et al. | 345/619 |
| 7,225,414 B1* | 5/2007 | Sharma et al. | 715/863 |
| 7,865,834 B1* | 1/2011 | van Os et al. | 715/756 |
| 7,904,826 B2* | 3/2011 | Vronay et al. | 715/782 |
| 2003/0080937 A1 | 5/2003 | Light | |
| 2005/0059488 A1* | 3/2005 | Larsen et al. | 463/36 |
| 2006/0098023 A1* | 5/2006 | Coulthard | 345/581 |
| 2007/0152983 A1 | 7/2007 | McKillop et al. | |
| 2007/0164988 A1* | 7/2007 | Ryu et al. | 345/156 |
| 2008/0024523 A1* | 1/2008 | Tomite et al. | 345/632 |
| 2008/0118143 A1* | 5/2008 | Gordon et al. | 382/154 |
| 2009/0153474 A1* | 6/2009 | Quennesson | 345/157 |
| 2009/0179914 A1* | 7/2009 | Dahlke | 345/619 |
| 2009/0251460 A1* | 10/2009 | Dunnigan | 345/419 |
| 2009/0322909 A1 | 12/2009 | Garcia | |
| 2010/0013860 A1* | 1/2010 | Mandella et al. | 345/650 |

OTHER PUBLICATIONS

Wang et al. Face Tracking as an Augmented Input in Video Games: Enhancing Presence, Role-playing and Control. CHI 2006, Apr. 22-27, 2006, Montréal, Québec, Canada. Copyright 2006 ACM.*

Alexandre R.J. Francois and Elaine Kang, "The Virtual Mirror" http://pollux.usc.edu/~afrancoi/virtualmirror/, retrieved Aug. 19, 2010, pp. 1-5.

* cited by examiner

SYSTEMS AND METHODS FOR ADJUSTING A DISPLAY BASED ON THE USER'S POSITION

BACKGROUND OF THE INVENTION

Using electronic devices, a user may view images of real or artificial three-dimensional objects. For example, a user surfing the Internet can view images of products available for purchase. As another example, a user of a graphic application (e.g., a CAD application) may create three-dimensional objects.

To view different perspectives of the three-dimensional objects, existing electronic devices may require the user to perform manipulations using input mechanisms, such as arrow keys or letter keys on a keyboard, mouse clicks and mouse movements, or combinations of inputs using different input mechanisms. For example, the user may provide a particular input device sequence to cause a displayed object to pan or rotate.

While this approach for viewing three-dimensional objects may be functional, it is hardly intuitive and may even be frustrating for new users, as they discover and learn the input device sequences used for each manipulation of the object. Furthermore, objects displayed on the electronic device screen may lack realism, because the electronic device cannot know the user's environment from which the object is being viewed.

SUMMARY OF THE INVENTION

An electronic device operative to change the perspective of displayed three-dimensional objects based on the user's position relative to the electronic device is provided. The electronic device may include a display for displaying objects, and a sensing mechanism for detecting the user's position. The sensing mechanism may be operative to detect the user's position using any suitable sensing approach, including for example optically (e.g., using a camera or lens), from emitted invisible radiation (e.g., using an IR or UV sensitive apparatus), electromagnetic fields, or any other suitable approach. The sensing mechanism may be placed in any suitable position relative to the display. For example, the sensing mechanism may be integrated in or adjacent the display (e.g., as an integrated camera above the display). This may allow the sensing mechanism a more accurate assessment of the user's position relative to the display. For example, if the sensing mechanism is integrated with the display, the sensing mechanism may detect the user's head using a camera, and determine the position of the user's head relative to the center of the display.

Using the detected position of the user, the electronic device may use any suitable approach to transform the perspective of three-dimensional objects displayed on the display. For example, the electronic device may use a parallax transform by which three-dimensional objects displayed on the screen may be modified to give the user the impression of viewing the object from a different perspective. This approach may be particularly effective, for example, for smaller objects or for objects displayed near the front-most plane of the display (e.g., such as a dock or menu options). As another example, the electronic device may use a perspective transform by which three-dimensional objects displayed on the screen may be modified to give the user the impression of viewing the object from a different perspective. Using a true perspective transform may be most effective, for example, for larger objects displayed on the screen or for objects displayed farther from the plane of the display. The electronic device may determine the amount or manner in which to transform a displayed object so that the object appears to be viewed from the user's detected position.

In some embodiments, the electronic device may perform different types of transforms on different objects when the sensing mechanism determines that the user's perspective has changed. For example, if a display has objects with which both perspective and parallax transforms are associated (e.g., based on the positions of the objects on the display, or based on metadata associated with the objects), the electronic device may apply the transforms associated with each object on different layers, and blend the modified objects to provide a display in which every three-dimensional object is modified to reflect the user's perspective from the detected position.

To make the displayed objects more realistic to the user, the electronic device may detect the user's environment and map the detected environment to the displayed objects. For example, using a camera, the electronic device may capture images of the user and of the user's environment. The electronic device may then simultaneously modify the object displayed based on the user's perspective and map the images of the captured environment to the displayed object. For example, the electronic device may define visual properties of different surfaces of the displayed object (e.g., reflection and refraction characteristics), and apply the visual properties to the portions of the detected image mapped on each surface. Using this approach, surfaces with low reflectivity (e.g., plastic surfaces) may not reflect the environment, but may reflect light, while surfaces with high reflectivity (e.g., polished metal or chrome) may reflect both the environment (e.g., the user's face as detected by the camera) and light. To further enhance the user's experience, the detected environment may be reflected differently along curved surfaces of a displayed object (e.g., as if the user were actually moving around the displayed object and seeing his reflection based on his position and the portion of the object reflecting the image).

In some embodiments, the electronic device may change the display of two-dimensional objects (e.g., application windows) based on the user's detected position. For example, the electronic device may assign depth values to each of several two-dimensional objects to artificially create a third dimension from which different perspectives may be determined. Then, as the user moves relative to the display, the electronic device may displace the windows (e.g., to display different portions of each window, or to distribute the windows across the display).

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION

Figure 1:
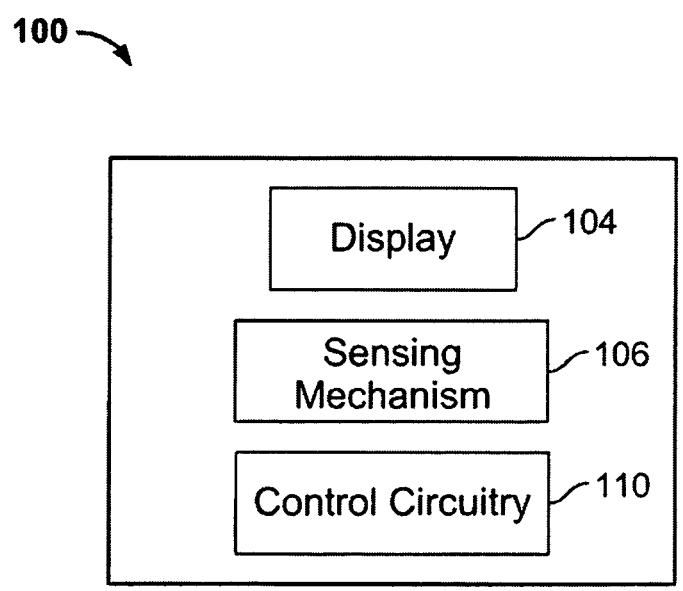
FIG. 1 is a schematic view of an electronic device in accordance with one embodiment of the invention.

FIG. 1 is a schematic view of a electronic device in accordance with one embodiment of the invention. Electronic device 100 may include display 104, sensing mechanism 106, and control circuitry 110. In some embodiments, electronic device 100 may include other components, including for example, an input mechanism, an audio output component, communications circuitry, a power supply, ports or interfaces for coupling to a host device, a secondary input mechanism (e.g., an ON/OFF switch), or any other suitable component.

Electronic device 102 may include any suitable device operative to display information to a user. For example, electronic device 102 may include a media player such as an iPod available by Apple Inc., of Cupertino, Calif., a cellular telephone, a personal e-mail or messaging device (e.g., a Blackberry® or a Sidekick®), an iPhone available from Apple Inc., pocket-sized personal computers such as an iPAQ Pocket PC available by Hewlett Packard Inc., of Palo Alto, Calif., personal digital assistants (PDAs), a desktop computer, a laptop computer (e.g., a MacBook or a MacBook Pro available from Apple Inc.), and any other electronic device (e.g., a device having a display for providing information to the user and a sensing mechanism for detecting the user or user inputs).

Display 104 may include any suitable screen or projection system for providing a display visible to the user. For example, display 104 may include a screen (e.g., an LCD screen) that is incorporated in electronic device 100. As another example, display 104 may include a movable display or a projecting system for providing a display of content on a surface remote from electronic device 100 (e.g., a video projector). Display 104 may be operative to display content (e.g., information regarding ongoing communications operations, information regarding incoming communications requests, media, or device operation screens) under the direction of control circuitry 110.

Sensing mechanism 106 may include any suitable mechanism for detecting and sensing the user. For example, sensing mechanism 106 may be operative to detect the position of the user's face relative display 104. As another example, sensing mechanism 106 may be operative to detect a particular feature of the user's face (e.g., the location of a user's eyes or mouth, whether the eyes or mouth are open, or what the eyes are looking at). As still another example, the electronic device may detect the position of a user's hands, arms, or other body part. As still yet another example, the electronic device may detect or sense the position of the user (e.g., the distance of the user from display 104, or the position of the user relative a portion or element of display 104).

Suitable sensing mechanisms may include, for example, an optical sensing mechanism (e.g., a camera operative to detect light), a mechanism operative to detect non-visible wavelengths (e.g., IR and UV radiation), a pressure sensing mechanism, a sound detecting mechanism (e.g., one or more microphones operative to detect from where sound is coming), any other suitable sensor for detecting a physical aspect of the user or the user's surroundings, or any other suitable mechanism. In some embodiments, sensing mechanism 106 may be incorporated in or adjacent display 104 (e.g., a camera incorporated above a laptop screen), another component of electronic device 100, or near any other portion of electronic device 100. In one implementation, sensing mechanism 106 may include a wide-angle lens embedded above display 104 (e.g., such that the user viewing the display may be framed by the lens).

Control circuitry 110 may be operative to control the operations and functions of electronic device 100. Control circuitry 110 may include, for example, a processor, a bus (e.g., for sending instructions to the other components of electronic device 100), memory, storage, or any other suitable component for controlling the operations of electronic device 100. In some embodiments, a processor may drive the display and process inputs received from the user interface or input mechanism. The memory and storage may include, for example, cache, Flash, ROM, and/or RAM. In some embodiments, memory may be specifically dedicated to storing firmware (e.g., for device applications such as an operating system, user interface functions, and processor functions).

Control circuitry 110 may be operative to execute instructions provided by firmware, software, or both implemented in electronic device 100. For example, control circuitry 110 may be operative to execute instructions provided by a communications application (e.g., an email or telephone application, or a remote access application), word processing application, a media playback application (e.g., a music, radio or video playback application), a system utility, a location-detection application, or any other suitable application for controlling operations of the electronic device. As another example, control circuitry 110 may be operative to manage and direct the display of on-screen elements based on outputs of sensing mechanism 106.

In some embodiments, electronic device 100 may include an input mechanism for providing instructions to electronic device 100. The input mechanism may include any suitable mechanism for providing user inputs or instructions to electronic device 100. The input mechanism may take a variety of forms, such as a keyboard, mouse, touchpad, touch strip, keypad, dial, click wheel, touch screen, or any other suitable input mechanism. In some embodiments, the input mechanism may be incorporated in display 104 (e.g., a touch screen or multi-touch input mechanism). The user interface may include a multi-touch screen such as that described in U.S. Pat. No. 6,323,846, which is incorporated by reference herein in its entirety. The user interface may emulate a rotary phone or a multi-button keypad, which may be implemented on a touch screen or the combination of a click wheel or other user input device and a screen. A more detailed discussion of such a rotary phone interface may be found, for example, in U.S. patent application publication No. 2007/0152983, publication on Jul. 5, 2007, entitled "Touch Pad with Symbols based on Mode," which is incorporated by reference herein in its entirety. In some embodiments, the input mechanism may include a mechanism that is remotely coupled to display 104 or communications circuitry 110. For example, the input mechanism may include a keyboard, keypad, mouse, remote controller, voice-instruction apparatus, or any other mechanism for providing inputs.

Although the following discussion will be provided in the context of detecting the position of a user's head relative to the display using a lens or camera, it will be understood that any other suitable portion of the user may be detected by the sensing mechanism, and that any other suitable type of sensing mechanism may be used. In addition, it will be understood that the change in display characteristics based on the position of the user's head may be supplemented or superseded by inputs received from an input mechanism (e.g., a touch screen embedded in the display, for example in display 104).

Figure 2:
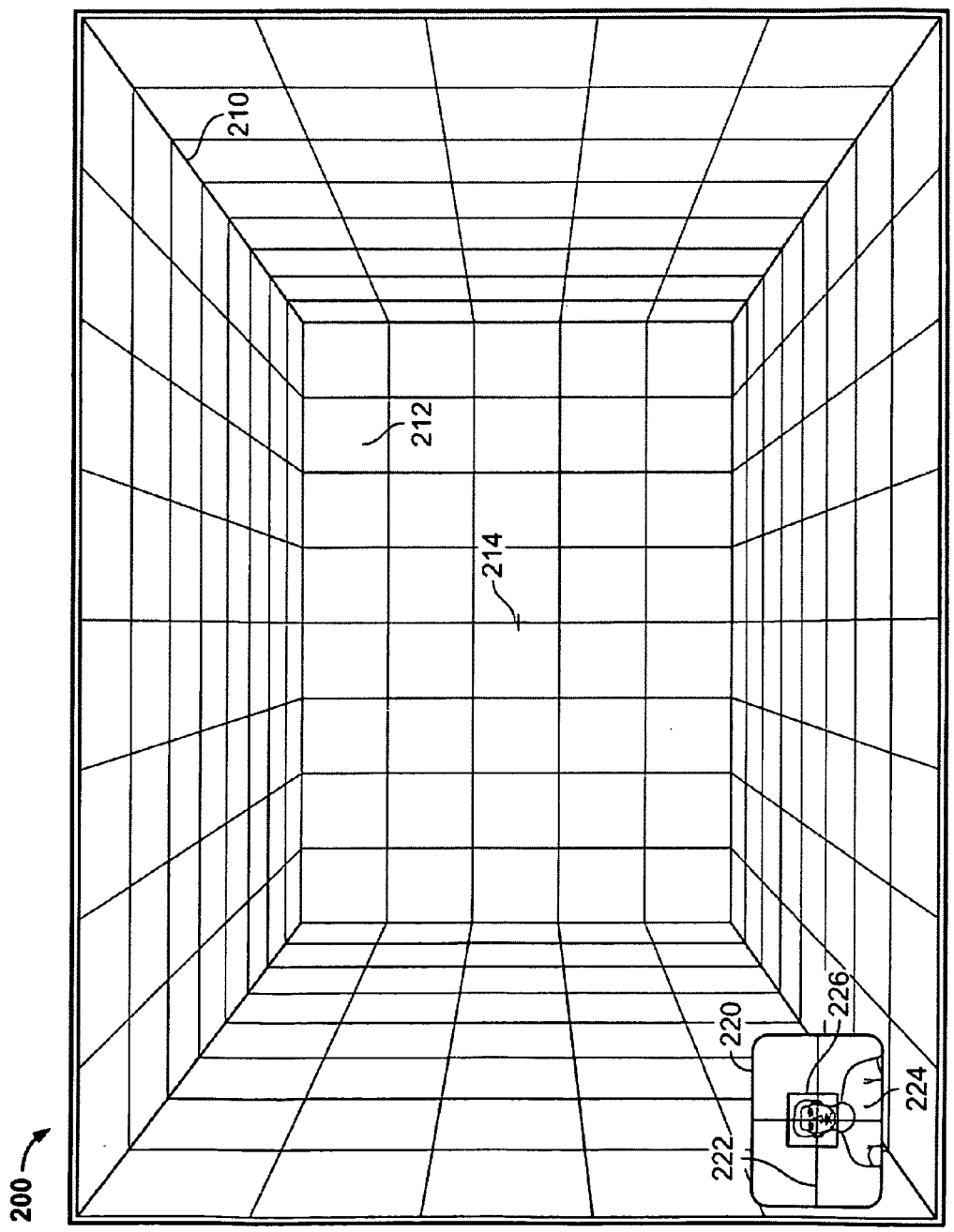
FIG. 2 is a schematic view of an illustrative display when the user is aligned with the center of the display in accordance with one embodiment of the invention.

FIG. 2 is a schematic view of an illustrative display when the user is aligned with the center of the display in accordance with one embodiment of the invention. For the purposes of illustration, display 200 and subsequent displays may include perspective grid 210 illustrating the current perspective of objects displayed in display 200. In the example of display 200, the display of objects is from the perspective of a user looking from the center of the screen (e.g., perpendicular to rear plane 212, which is parallel to the display screen itself), and aligned with vanishing point 214).

The electronic device may determine the current perspective for display 200 (e.g., the current orientation of grid 210) using any suitable approach. In some embodiments, the current perspective may be related to a detected position of the user relative a component of the electronic device (e.g., relative display 104 or sensing mechanism 106, FIG. 1). The electronic device may detect or sense the user's position using any suitable approach. In some embodiments, the electronic device may use a sensing mechanism, such as a camera or optical lens (e.g., sensing mechanism 106) to detect the position of the user. For example, using a camera the electronic device may detect the user's face from the background (e.g., based on particular attributes of a human face, or based on the difference in shape or color between the background and the user), and determine the position of the user's head in the field of view of the camera. As another example, the electronic device may use an IR or heat-sensitive camera, or an optical camera with an adequate lens to distinguish the user's body (e.g., the user's head or torso) from the background to determine the position of the user relative to the camera field of view. This approach may be particularly useful in low light or night situations.

The electronic device may quantify the position of the user relative to the electronic device using any suitable approach. In some embodiments, the electronic device may determine the position of the user in a grid or window (e.g., determine the position of the user as a point or box in a frame). To assist the user in correlating changes in the display (e.g., changes in grid 210) with movements of the user, the electronic device may direct the display to depict the user's position relative to the display or relative to the sensing mechanism. For example, display 200 may include window 220 showing the image sensed by the sensing mechanism. In particular, the boundaries of window 220 may reflect the boundaries or limits of the sensing mechanism (e.g., window 220 depicts the entire field of view of the sensing mechanism). Window 220 may include crosshairs 222 indicating the identified focal point of the sensing mechanism and a graphical representation of user 224. For example, the electronic device may define, based on the output of the sensing mechanism, box 226 placed around the contours of the user's head. When operating properly, the intersection of crosshairs 222 may be located at the center of box 226. As another example, the electronic device may detect a particular element of the user's face (e.g., the user's eyes, nose, mouth, or combinations of these) and place the intersection of crosshairs 222 on or adjacent the detected elements (e.g., crosshairs 222 is located on the user's nose).

The electronic device may display window 220 at any suitable time. In some embodiments, the electronic device may display window 220 only when particular conditions are met, such as for example in response to a user request (e.g., an input on an input mechanism), the sensor mechanism detecting a particular movement (e.g., a movement over a large distance), when the sensing mechanism cannot sense the user's position (e.g., to direct the user to re-enter the frame of view), or any other suitable condition. The electronic device may remove the displayed window 220 at any suitable time, including for example in response to a user request (e.g., an input from the input mechanism), after a particular delay (e.g., 30 seconds after receiving a user input), after detecting that the user has not moved more than a defined threshold within a period of time (e.g., the user is substantially immobile relative to the sensing mechanism), or at any other suitable time.

Figure 3:
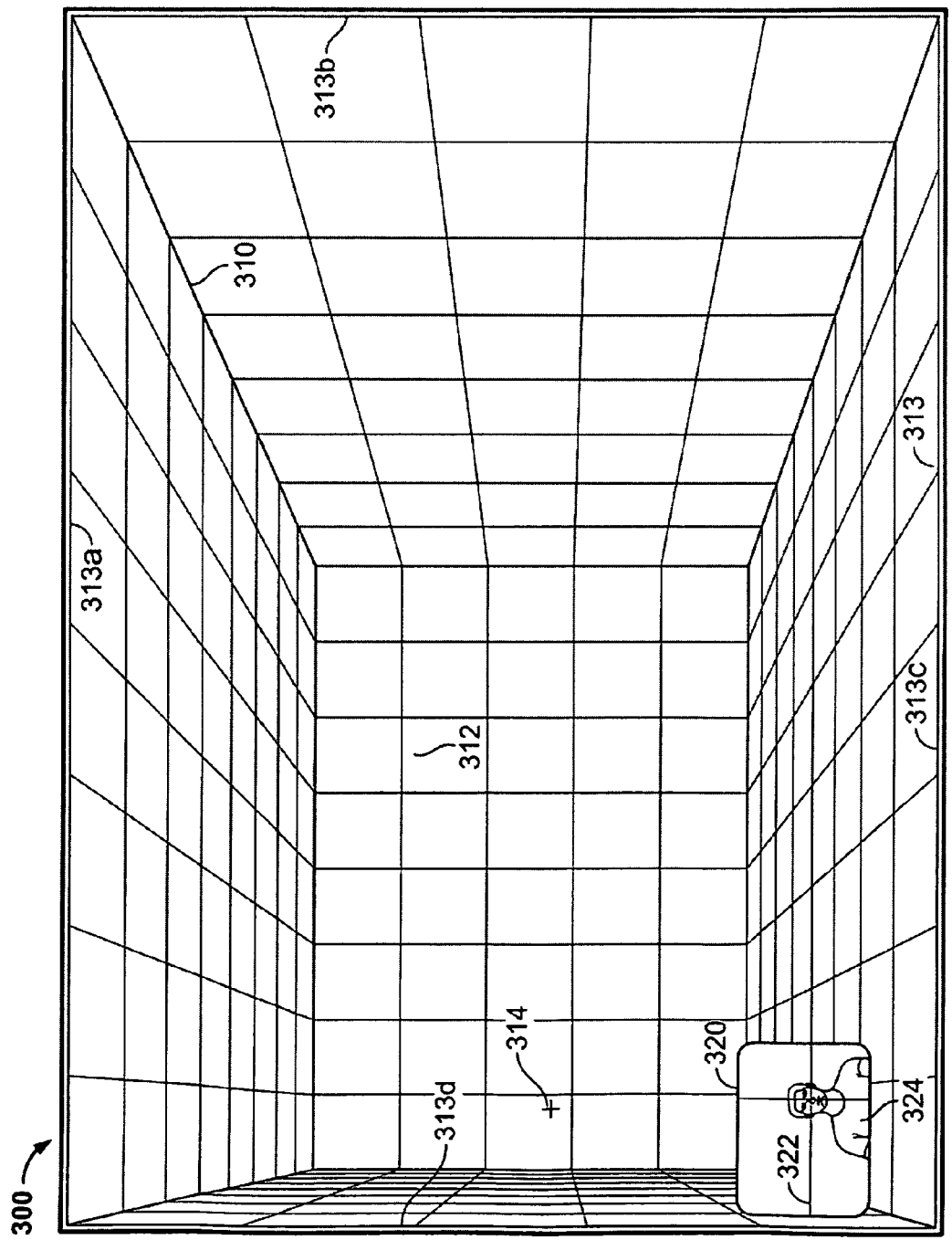
FIG. 3 is a schematic view of a display to which a parallax transform is applied when the user moves to the right in accordance with one embodiment of the invention.

As the user moves relative to the electronic device, the sensing mechanism may detect the user's movement and change the display based on the movements. In some embodiments, the electronic device may use a parallax approach for modifying the display based on the user's movement. FIG. 3 is a schematic view of a display to which a parallax transform is applied when the user moves to the right in accordance with one embodiment of the invention. Display 300 may include perspective grid 310, in which rear plane 312 remains parallel to front plane 313, located on the face of the display screen (e.g., as defined by lines 313a, 313b, 313c and 313d). When the electronic device determines that the user has moved (e.g., the sensing mechanism detects that the user's head has moved to the right), the electronic device may shear rear plane 312 with respect to front plane 313 (e.g., to the left) such that vanishing point 314 moves (e.g., to the left).

The electronic device may use any suitable approach for determining how much to move rear plane 312 based on the detected movement of the user. For example, the electronic device may associate a linear or non-linear (e.g., exponential or logarithmic) correlation between the amount of the user's movement as detected by the sensing mechanism and the amount by which to shear rear plane 312. In some embodiments, the association may be defined such that the when the user's head is aligned with the center of the sensing mechanism (e.g., the center of the display), rear plane 312 is not sheared with respect to front plane 313, and when the sensing mechanism detects that the user has reached a boundary of the sensing mechanism interface (e.g., the lens detects the user's head at an edge of the frame of view), the corresponding edges of rear plane 312 and front plane 313 overlap or substantially overlap. For example, the electronic device may determine the position of the user's head relative to the center point or origin of the sensing mechanism (e.g., relative to the center of window 320), and shear rear plane 312 in a direction and by an amount related to the symmetrical of the position of the user's head relative to the center point (e.g., so that the ratios of the amount of the user's head movement over the total head movement possible in the direction of movement and the amount of the rear plane shear over the total amount of rear plane shear possible in the direction of the movement is the same).

By shearing rear plane 312 in a manner related to the user's movement, the user's perspective of the display may appear to change based on the user's movement. In particular, vanishing point 314 of the display, which may define the perspective from which objects in display 300 are viewed, may be displaced along with rear plane 312 such that the display of objects in display 300 is adjusted for the new vanishing point location. Vanishing point 314 may be displaced by any suitable amount and based on any suitable approach. For example, the location of vanishing point 314 may be adjusted using any of the approaches described above in connection with displacing rear plane 312 (e.g., a linear or non-linear correlation of the user's movements and the displacement of vanishing point 314). In one implementation, the correlation may be defined such that the ratios of the amount of the user's head movement over the total head movement possible in the direction of movement and the amount of the vanishing point displacement over the total amount of vanishing point movement available in the direction of the movement is the same. Thus, any object displayed on screen 300 may shear at least in part as indicated by grid 310 to accommodate for the user's new perspective.

Display 300 may include window 320 that includes some or all of the characteristics of window 220 (FIG. 2). As shown in window 320, the graphical representation of the user 324 and crosshairs 322 may be displaced to the right (e.g., relative to the position of the graphical representation of the user and the crosshairs of FIG. 2), thus indicating that the user's perspective of display 300 has changed. In some embodiments, the correlation between the user's movements and rear plane 312 and vanishing point 314 may be discernable to the user based on the displacement of crosshairs 322 in window 320.

Figure 4:
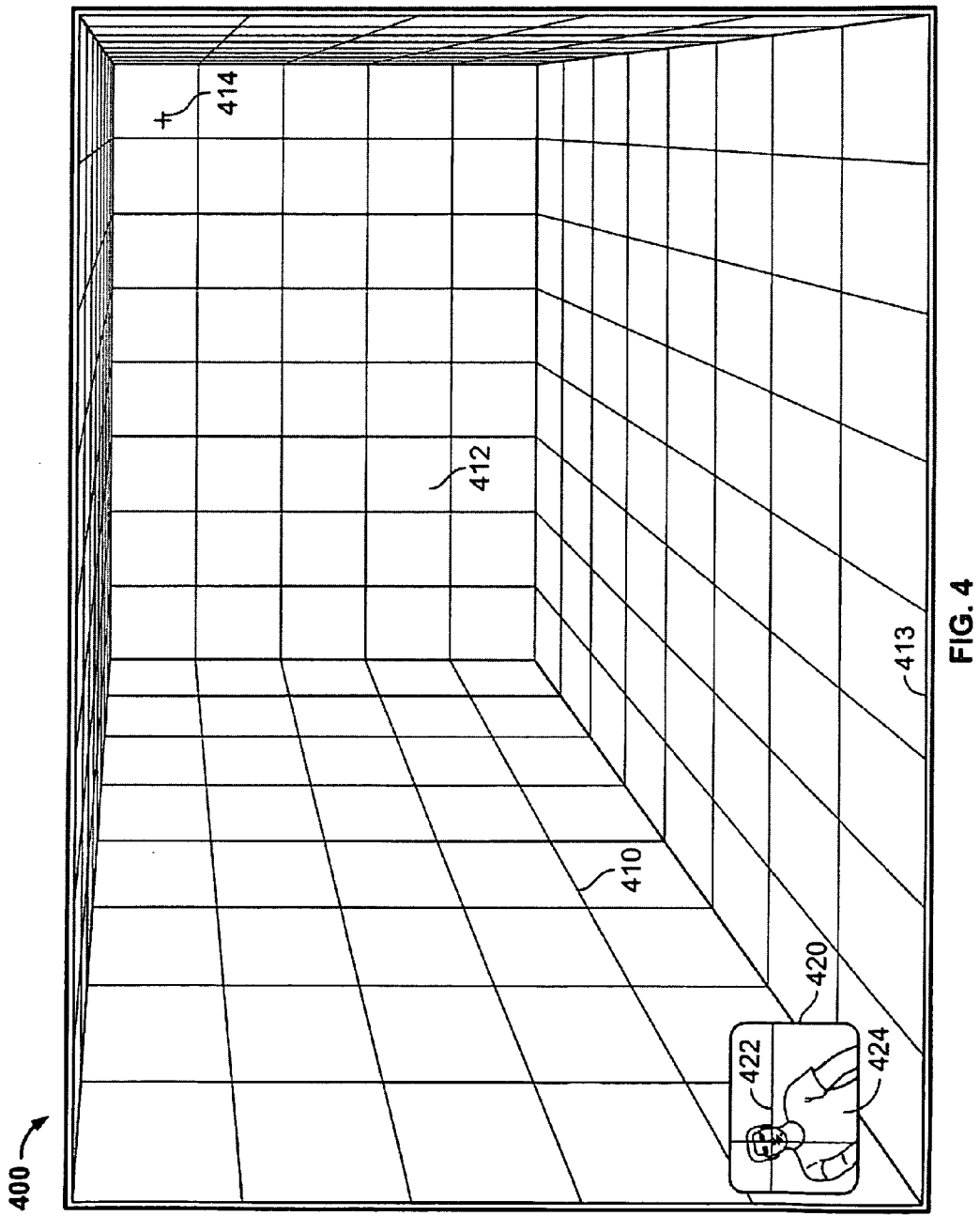
FIG. 4 is a schematic view of a display to which a parallax transform is applied when the user moves to the left in accordance with one embodiment of the invention.

FIG. 4 is a schematic view of a display to which a parallax transform is applied when the user moves to the left in accordance with one embodiment of the invention. Similar to display 300, display 400 may include perspective grid 410 with rear plane 412 that remains parallel but shears relative front plane 413. In the example of display 400, the sensing mechanism has detected that the user has moved to the left and up (e.g., as seen by the placement of crosshairs 422 and user 424 in window 420), and accordingly has sheared rear plane 412 and vanishing point 414 to the right and up.

Figure 5:
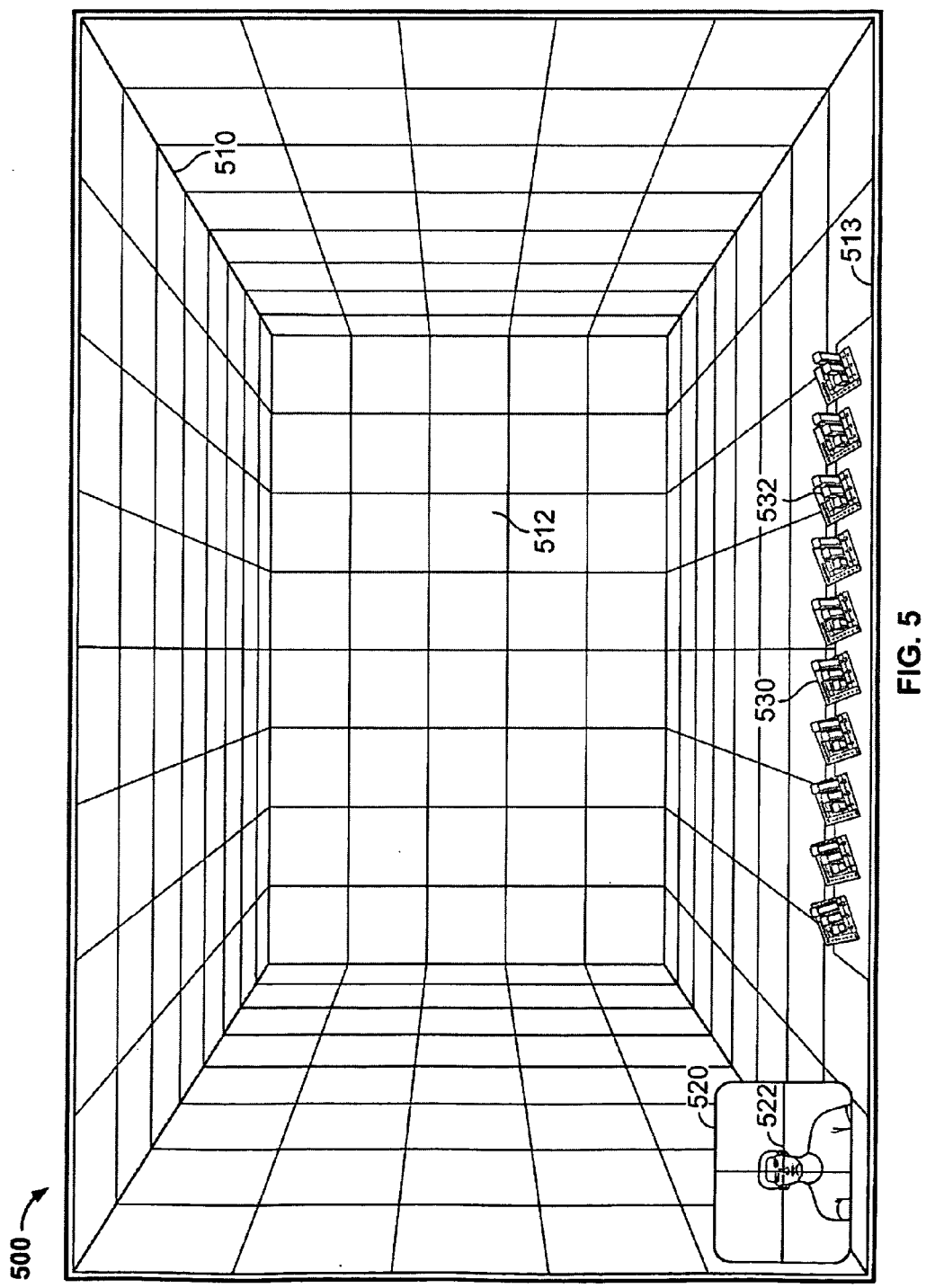
FIG. 5 is a schematic view of a display having a dock of items when the user is centered relative to the sensing mechanism of the electronic device in accordance with one embodiment of the invention.
Figure 6:
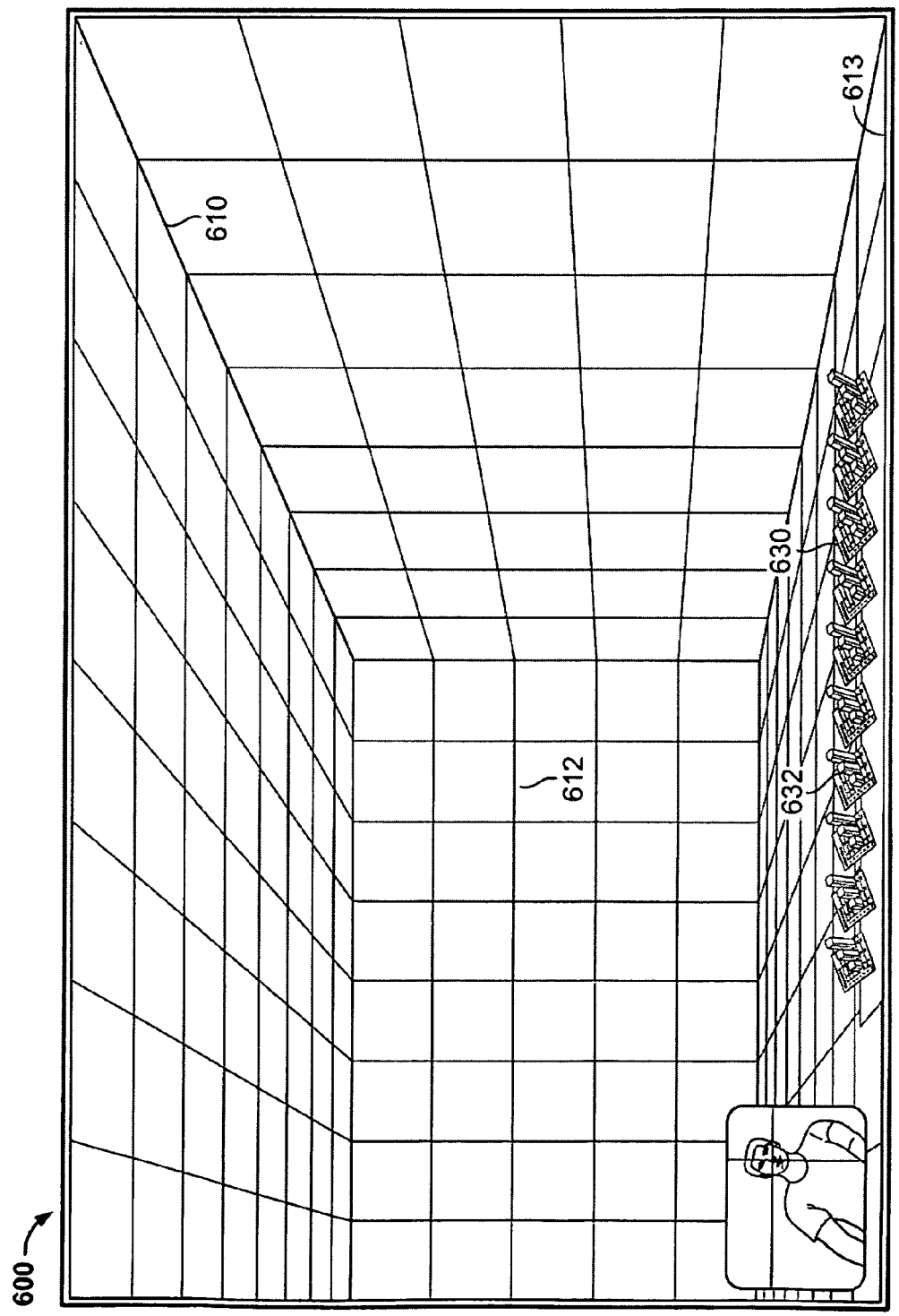
FIG. 6 is a schematic view of a display having a dock of items to which a parallax transform is applied when user moves to the right in accordance with one embodiment of the invention.
Figure 7:
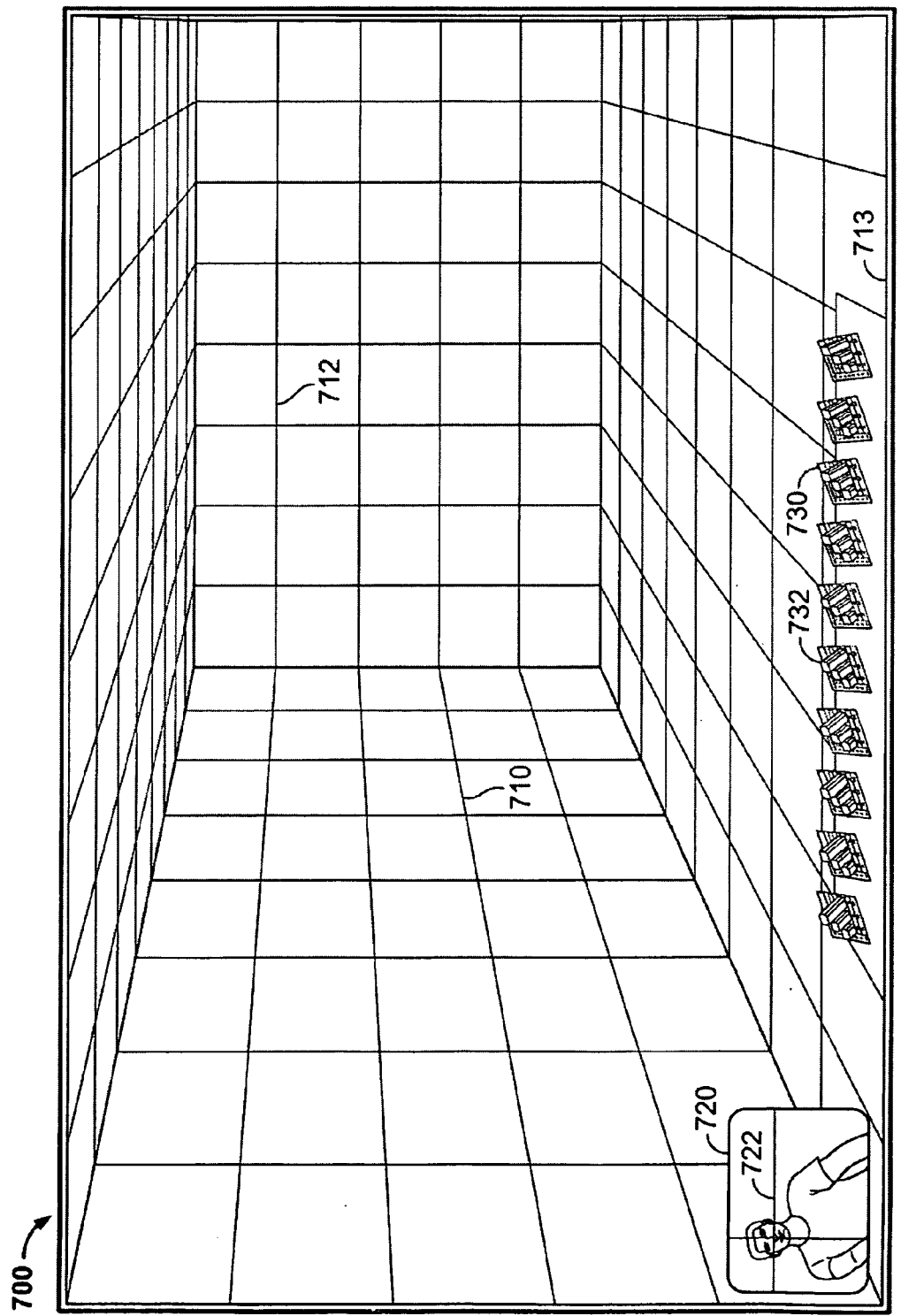
FIG. 7 is a schematic view of a display having a dock of items to which a parallax transform is applied when the user moves to the left in accordance with one embodiment of the invention.

In some embodiments, the parallax approach illustrated in FIGS. 3 and 4 may be applied to change the appearance of icons displayed on the display based on the detected position or movement of the user. In particular, the parallax approach may be particularly advantageous for providing a display with changing perspectives of objects displayed along the edges of the screen or near the front plane of the display (e.g., because the front plane remains fixed as the perspective changes). FIG. 5 is a schematic view of a display having a dock of items when the user is centered relative to the sensing mechanism of the electronic device in accordance with one embodiment of the invention. FIG. 6 is a schematic view of a display having a dock of items to which a parallax transform is applied when user moves to the right in accordance with one embodiment of the invention. FIG. 7 is a schematic view of a display having a dock of items to which a parallax transform is applied when the user moves to the left in accordance with one embodiment of the invention. Displays 500, 600 and 700 may include grids 510, 610 and 710, respectively, each defining rear planes 512, 612 and 712 and front planes 513, 613 and 713, respectively. The grids and planes of displays 500, 600 and 700 may include some or all of the features described above in connection with FIGS. 2-4.

Display 500 may include dock 530 that includes several icons 532. Dock 530 may include any suitable number of icons 532, each of which may represent applications, documents, or other objects that the user may select or launch, for example using an input mechanism (e.g., a mouse or touching the icons via a touch screen or touchpad). Some or all of icons 532 may be three-dimensional icons, such that a portion of each icon 532 may not be visible from the user's current perspective. For example, if the sensing mechanism detects that the user is aligned with the center of the display (e.g., crosshairs 522 indicating the user's position in window 520), the display may only include a front view of icons 532 (e.g., as if icons 532 were standard, two-dimensional icons).

When the user moves to the right or left relative to the center of the display, the electronic device may apply a parallax transform to the display and to dock 530, thus changing the view of icons 532 to reflect the user's perspective as detected by the sensing mechanism. For example, when the user moves to the right, as shown by crosshairs 622 in window 620, the perspective of display 600 may change such that icons 632 in dock 630 appear to be viewed from the right of the screen (e.g., as if the user was looking at the icons from a position to the right of the screen. As another example, when the user moves to the left, as shown by crosshairs 722 in window 720, the perspective of display 700 may change such that icons 732 in dock 730 appear to be viewed from the left of the screen (e.g., as if the user was looking at the icons from a position to the left of the screen).

The electronic device may use any suitable approach for determining the amount by which to shear, rotate, or modify the appearance of icons 632 and 732 as the user moves. For example, the electronic device may first determine the position of each icon relative to the initial vanishing point of the display (e.g., the center of the display). The electronic device may then determine lines from some or all of the elements or portions of each icon to the vanishing point (e.g. the edges of each icon, or the primary or major elements of each icon, for example the bars forming the chart in icons 632 and 732). When the user moves and causes the vanishing point to move, the electronic device may identify the change to the lines determined for each icon, and change the orientation of the corresponding elements or portions of each icon to match the orientation of the identified lines. This may cause each icon to shear or rotate, thus creating the effect of viewing the icon from a new or different perspective. The amount of the change in the icon display may then be controlled by the correlation between the user's movement and the vanishing point (e.g., as discussed above in connection with FIGS. 2-4).

Figure 8:
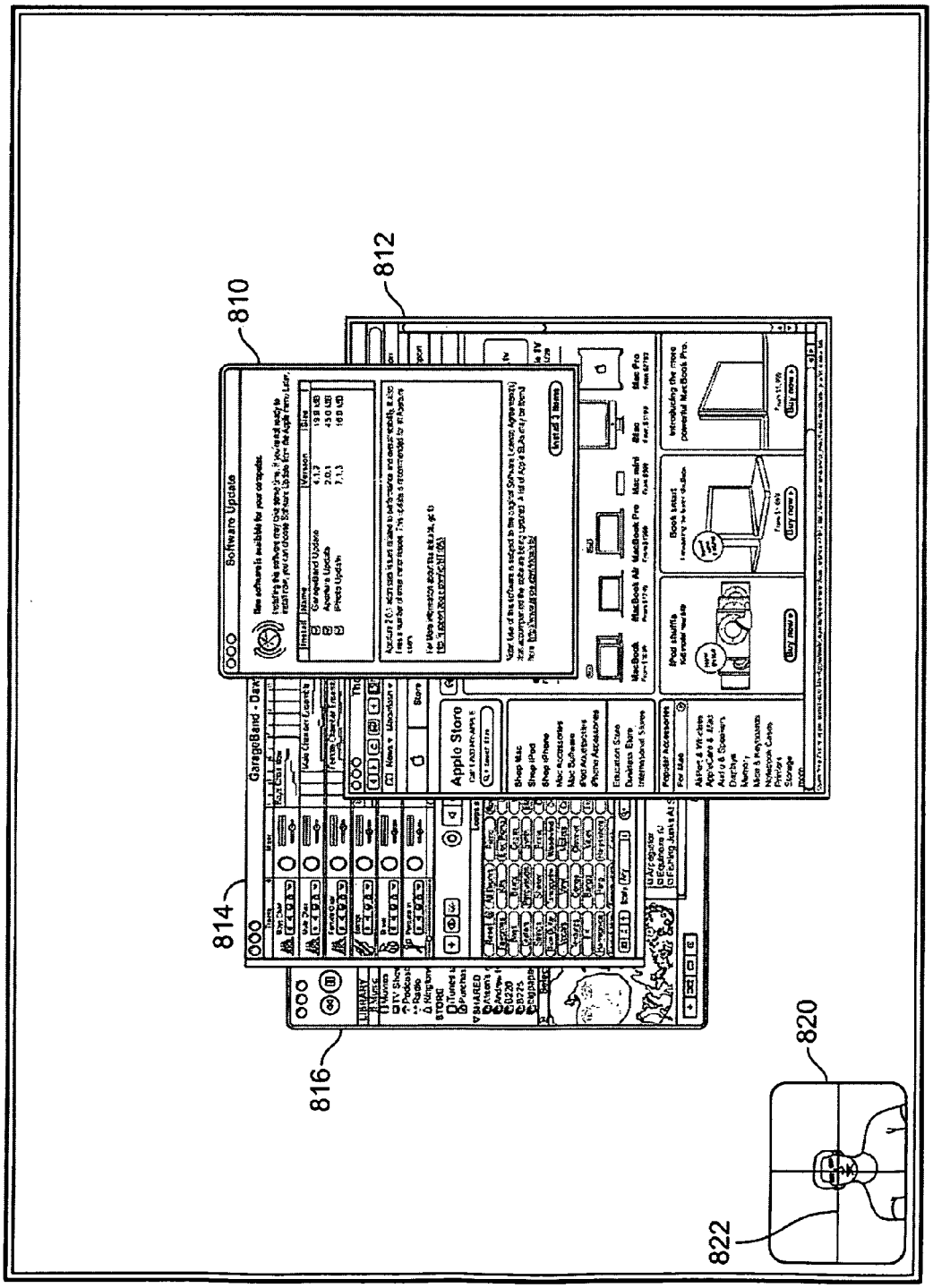
FIG. 8 is a schematic view of an illustrative display screen having several windows in accordance with one embodiment of the invention.

In some embodiments, the electronic device may change the position of two-dimensional windows or other objects displayed on screen based on the user's position relative to the electronic device (e.g., relative to the sensing mechanism). Although the following discussion will be limited to the context of displacing windows, it will be understood that this approach may be applied to any type of object or element displayed on a display, or to any suitable combination of types of elements. FIG. 8 is a schematic view of an illustrative display screen having several windows in accordance with one embodiment of the invention. Display 800 may include several windows (e.g., application windows) that the user may select to view information or perform electronic device operations. Because of limitations in the size of display 800 and of the size of each of windows 810, 812, 814 and 816, the windows may overlap, sometimes even substantially. In some embodiments, display 800 may include so many windows, or windows disposed in such a manner that entire windows may be hidden from view. The illustrative distribution of windows 810, 812, 814 and 816 in display 800 may be the standard or original distribution. In particular, this may be seen by the central position of crosshairs 822 in window 820, which depicts the sensing mechanism's determination of the current position of the user.

Figure 9:
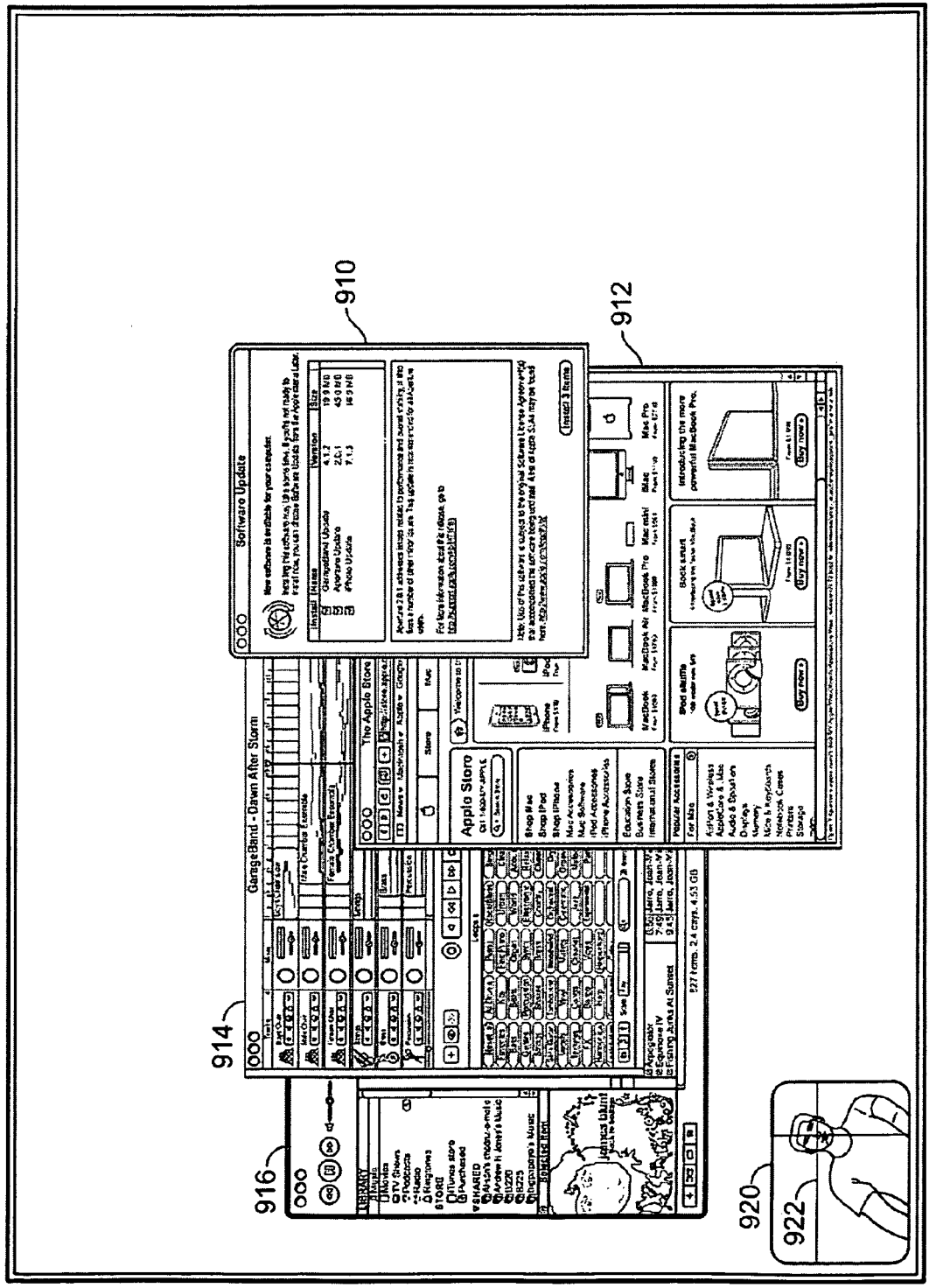
FIG. 9 is a schematic view of the illustrative display screen of FIG. 8 when the user moves in accordance with one embodiment of the invention.

To view windows that are at least partially hidden from view, the user may move to cause the windows to shift. FIG. 9 is a schematic view of the illustrative display screen of FIG. 8 when the user moves in accordance with one embodiment of the invention. Display 900 may include windows 910, 912, 914 and 916, which may be the same as windows 810, 812, 814 and 816 (FIG. 8). Unlike the windows of display 800, windows 910, 912, 914 and 916 may be distributed on display 900 such that different portions of windows 910, 912, 914 and 916 may be visible to the user. The movement of the windows in display 900 relative to the position of the windows in display 800 may be related to the movement of the user's head, for example indicated by the change in position of crosshairs 922 in window 920 relative crosshairs 822.

The electronic device may use any suitable approach for correlating the movement of each window and the movement of the user. In particular, because the displayed windows are not three-dimensional objects, there cannot be any lines from elements or portions of each window to a vanishing point. Accordingly, the electronic device may need to create an artificial depth or third dimension to be correlated with the user's movements. For example, the electronic device may assign each window a depth value. For example, the electronic device may assign consecutive numbers (e.g., integers) to each window, where the highest number is associated with the window closest to the user (or farthest from the user). Each depth may be associated with a particular range of movement. For example, the top window may remain immobile when the user moves (e.g., window 810/910, depth=1, does not move between FIGS. 8 and 9). The next window (e.g., window 912, depth=2) may have a range of motion that is substantially less than the size of display 900 (e.g., one half of the available range of motion). Each window subsequent window may have more motion until the last window (e.g., window 916, depth=4) may have a range of motion that is substantially equal to the available range of motion. Alternatively, as another example, the last window may be immobile, while the top window may have the largest range of motion. As still another example, every window may move (no window may remain immobile). In some embodiments, the electronic device may instead or in addition associate different ranges of motion based on the size of particular windows (e.g., instead of or in addition to associating ranges of motion based on depth values).

The range of motion of each window may be centered around any suitable portion of the display. For example, the range of motion for each window may be centered around the center point of the display, or the vanishing point associated with a particular user position (e.g., the user detected in the center of the sensing mechanism field of view). As another example, the range of motion for each window may be centered around the position of each window at a particular user position (e.g., the position of each window when the user is detected in the center of the sensing mechanism field of view). In some embodiments, the range of motion for a particular window may be reduced by the proximity of the window to an edge of the display. For example, if a window is near the edge of a display such that the distance between the center of the window's range of motion and an edge of the screen is less than one half the window's range of motion in the direction of the edge, the window may abut the edge of the display and not move any further despite additional movements of the user. Alternatively, the window may partially or entirely move out of the display when the position of the user is associated with a displacement that extends beyond the edge of the display.

The electronic device may use any suitable approach for correlating the amount of movement of the user with the displacement of each window. For example, the electronic device may use a linear correlation between the amount of the user's movement and the displacement of each window (e.g., relative to the range of motion of each window). As another example, the electronic device may use a non-linear correlation (e.g., a polynomial, exponential or logarithmic) between the movement of the user's head and the displacement of each window. In some embodiments, the electronic device may select the correlation based on the position or overlap of several windows, for example to maximize the portion of each window displayed with minimal user movement.

Figure 10:
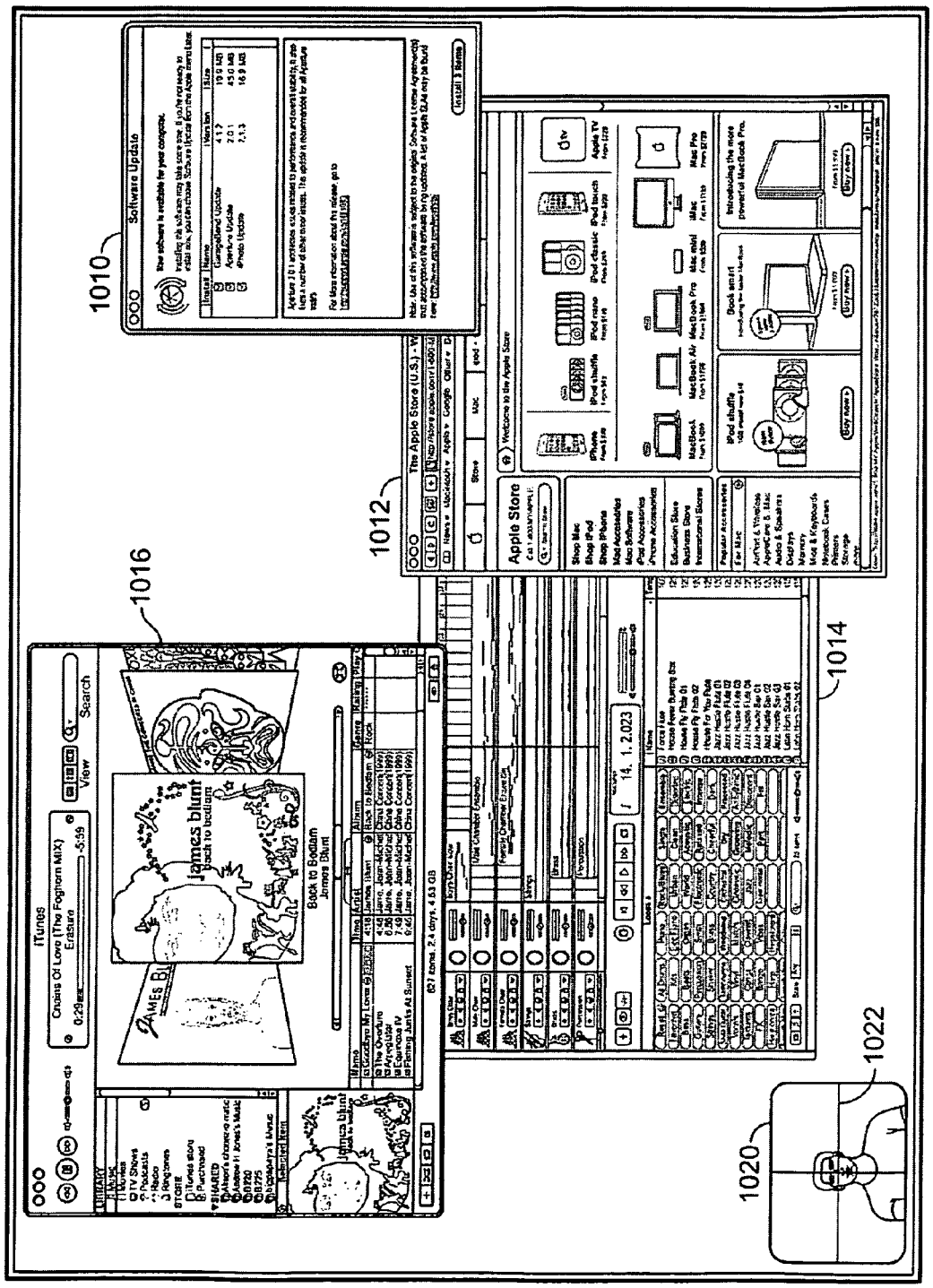
FIG. 10 is a schematic view of the illustrative display screen of FIG. 8 when the user moves at least one window using an input mechanism in accordance with one embodiment of the invention.

The windows may be distributed on the display using any suitable approach. For example, the user may place windows in different areas of the display such that when the user is centered with respect to the sensing mechanism, all or most of several windows are visible. FIG. 10 is a schematic view of the illustrative display screen of FIG. 8 when the user moves at least one window using an input mechanism in accordance with one embodiment of the invention. Display 1000 may include windows 1010, 1012, 1014 and 1016, which may the same as windows 810, 812, 814 and 816 (FIG. 8). The user may move or displace windows using any suitable approach. For example, the user may select a window using an input mechanism (e.g., a mouse) and drag the window. As another example, the user may select and drag a window by touching the window on the screen (e.g., in a touch screen implementation). As shown by crosshairs 1022 in window 1020, the sensing mechanism of the electronic device may detect that the user is in substantially the same position in the displays of both FIGS. 8 and 10. This may thus illustrate that the electronic device may change the position of windows by both detecting movements of the user (e.g., as in FIG. 9) or in response to a user providing an input to change the position of a window (e.g., as in FIG. 10).

Figure 11:
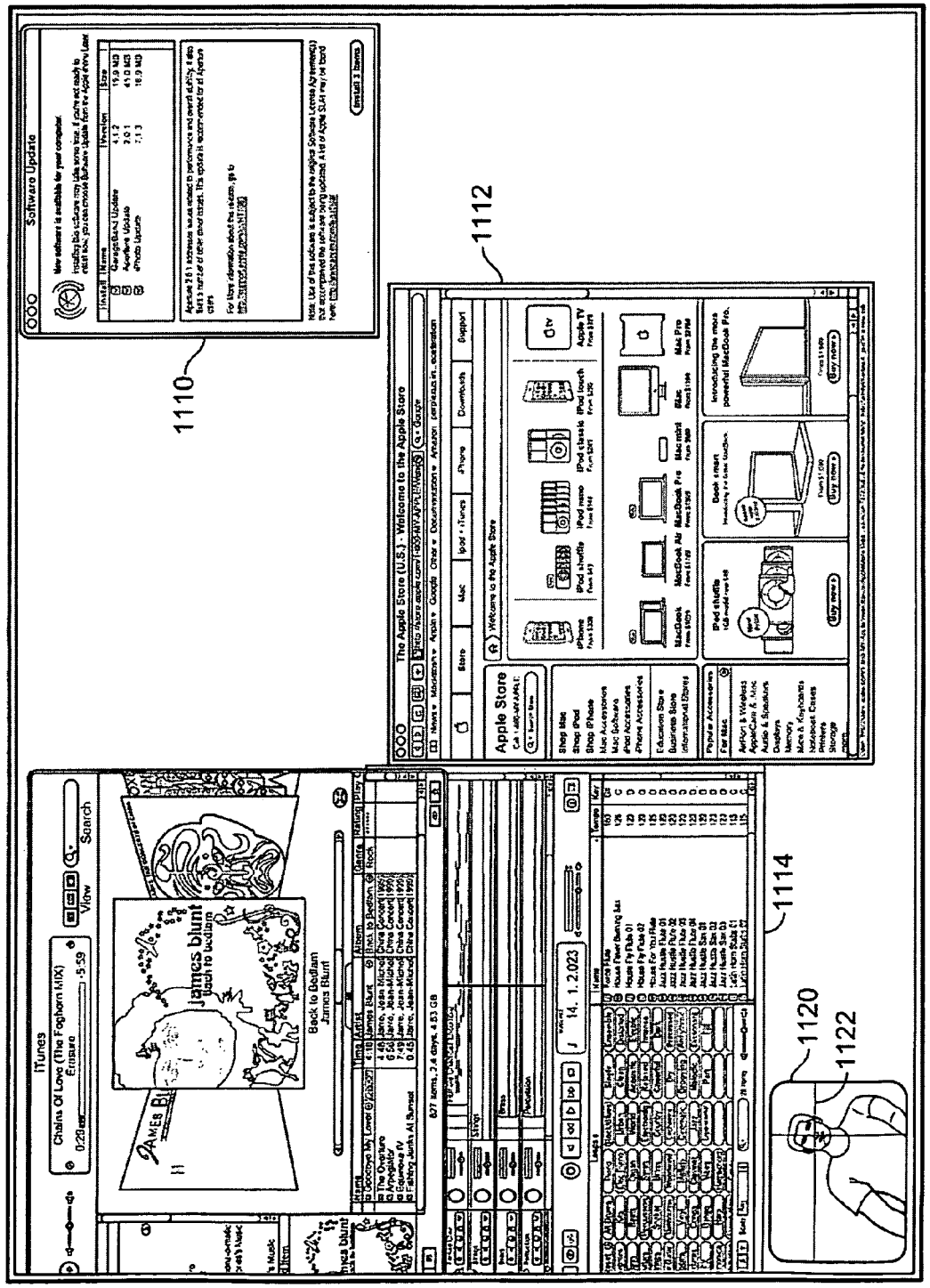
FIG. 11 is a schematic view of the illustrative display screen of FIG. 10 when the user moves in accordance with one embodiment of the invention.

As the user moves relative to the sensing mechanism, the electronic device may displace or move each window of display 1000, for example in a manner similar to that described in connection with display 900 (FIG. 9). FIG. 11 is a schematic view of the illustrative display screen of FIG. 10 when the user moves in accordance with one embodiment of the invention. Display 1100 may include windows 1110, 1112, 1114 and 1116, which may be the same as windows 1010, 1012, 1014 and 1016 (FIG. 10). Unlike the windows of display 1000, windows 1110, 1112, 1114 and 1116 may be distributed on display 1100 such that different portions of windows 1110, 1112, 1114 and 1116 may be visible to the user. The movement of the windows in display 1100 relative to the position of the windows in display 1000 may be related to the movement of the user's head, for example indicated by the change in position of crosshairs 1122 in window 1120 relative crosshairs 1022. In the implementation of display 1100, all of the windows may move in response to the user moving (e.g., as seen by comparing displays 1000 and 1100).

Figure 12:
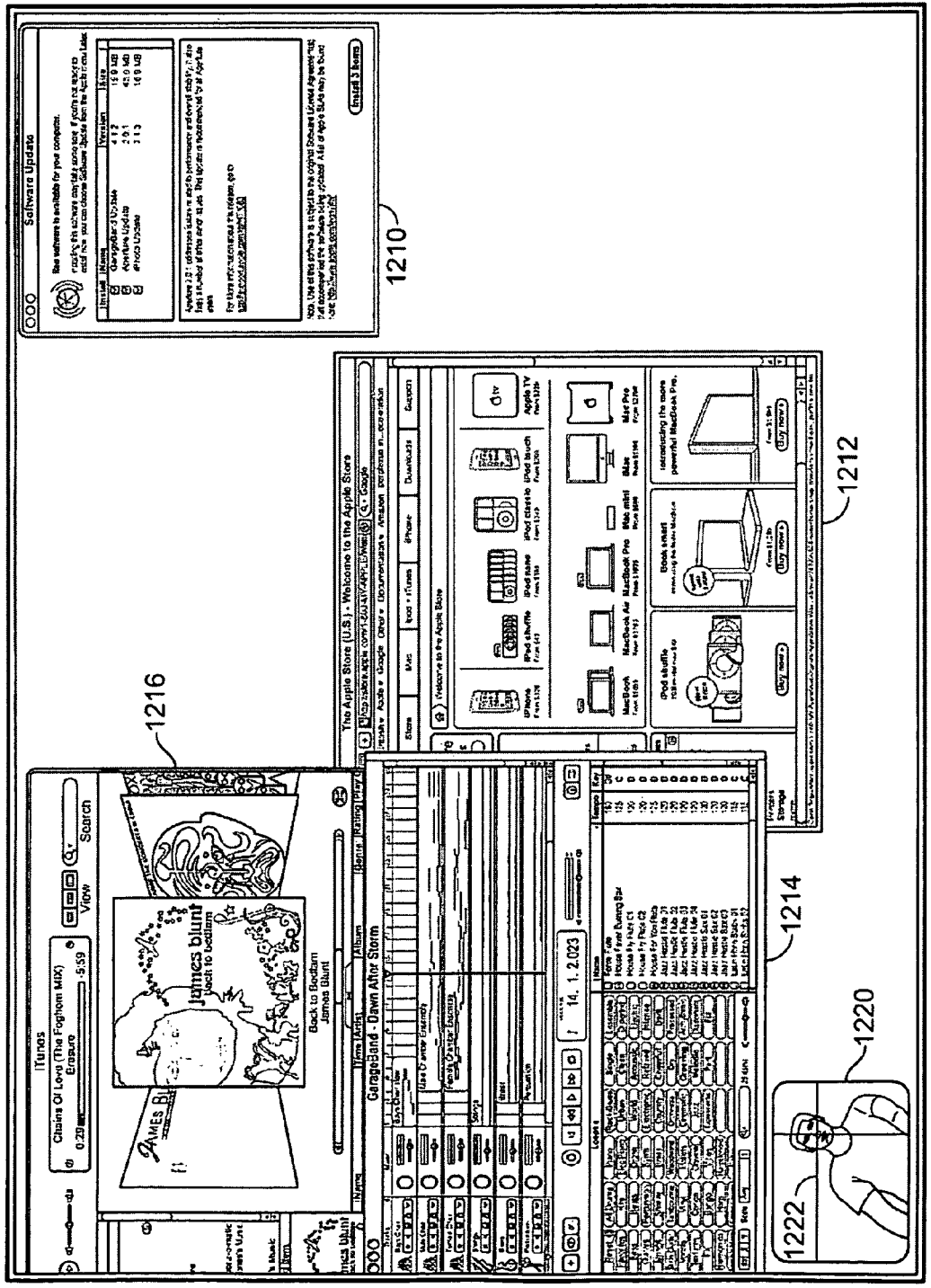
FIG. 12 is a schematic view of the illustrative display screen of FIG. 11 after the user selects a window in accordance with one embodiment of the invention.

The user may select one or more displayed windows 1110, 1112, 1114 and 1116 at any suitable time, including for example after detecting movements of the user. For example, the user may select window 1114 to bring it to the front of the display. FIG. 12 is a schematic view of the illustrative display screen of FIG. 11 after the user selects a window in accordance with one embodiment of the invention. Display 1200 may include windows 1210, 1212, 1214 and 1216, which may be the same as windows 1110, 1112, 1114 and 1116. In addition, the windows of display 1200 are distributed based on the user's position indicated by crosshairs 1222 in window 1220, which may not be in the center of the sensing mechanism field of view. As shown in display 1200, window 1214 be selected and brought to the front of the display (e.g., while window 1114 is behind window 1116 in display 1100, window 1214 is in front of windows 1212 and 1216. For example, the user may maintain a position away from the center of the sensing mechanism field of view and select window 1216 using an input mechanism or by touching the window on the screen. Upon receiving the selection of window 1216, the electronic device may change the depth value associated with window 1216 (e.g., change the value from 4 to 1, and change the values of the remaining windows accordingly) to account for the user's selection. In some embodiments, the electronic device may also determine new ranges of motion for each window of display 1200 based on at least one of the current position of each window, the new or revised depth value of each window, the detected position of the user, or any other suitable criteria. The electronic device may also determine the position of each window relative to the newly determined range of motion so that the electronic device may displace the windows appropriately based on subsequent detected movements of the user. In some embodiments, upon receiving a user selection of window 1216 (or any other suitable window), the electronic device may adjust or modify the position of other windows based on determined ranges of motion for each depth and relative window positions (e.g., cause other windows to jump upon selecting a rear window).

Figure 13:
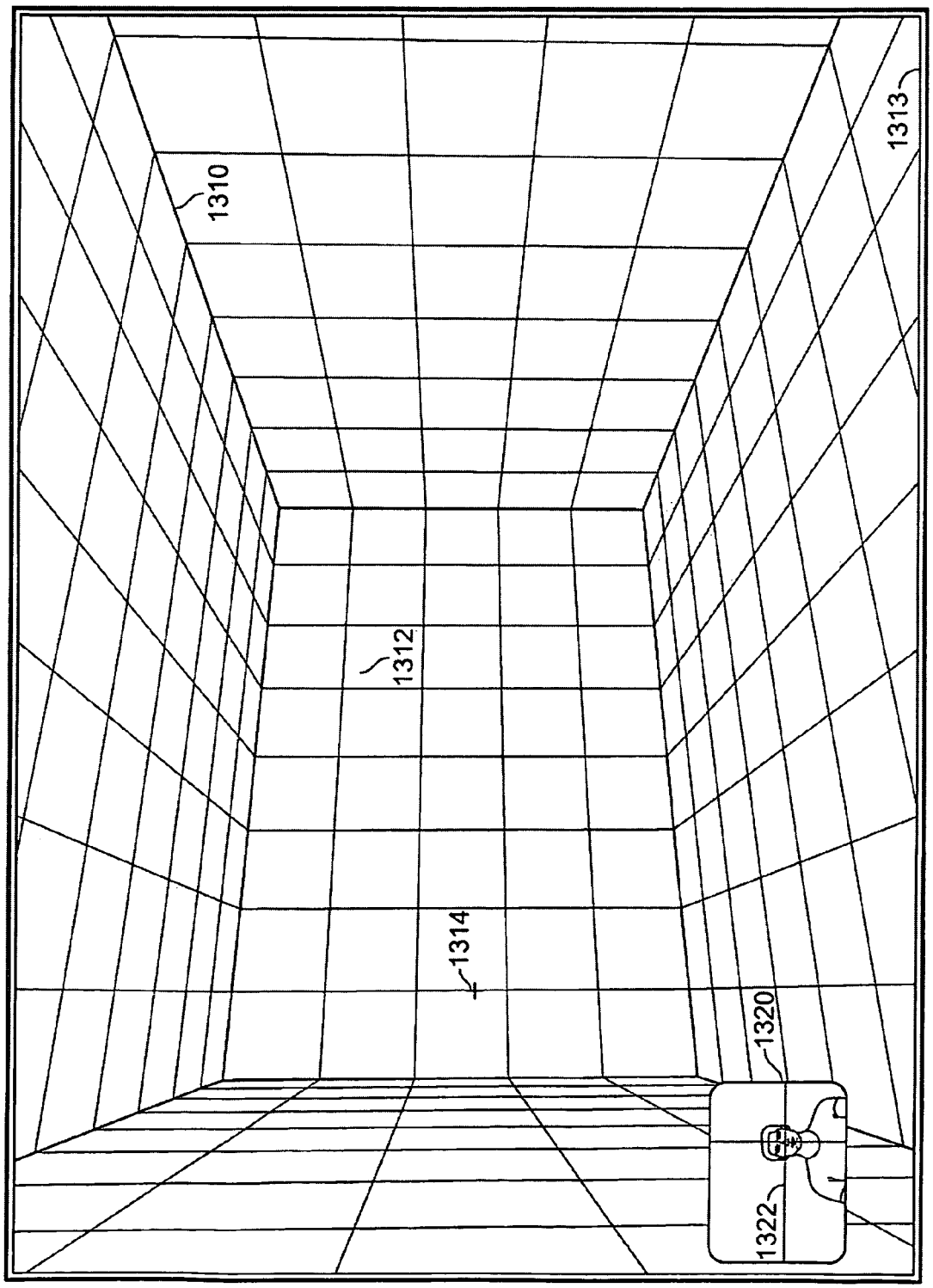
FIG. 13 is a schematic view of a display to which a perspective transform is applied when the user moves to the right in accordance with one embodiment of the invention.
Figure 14:
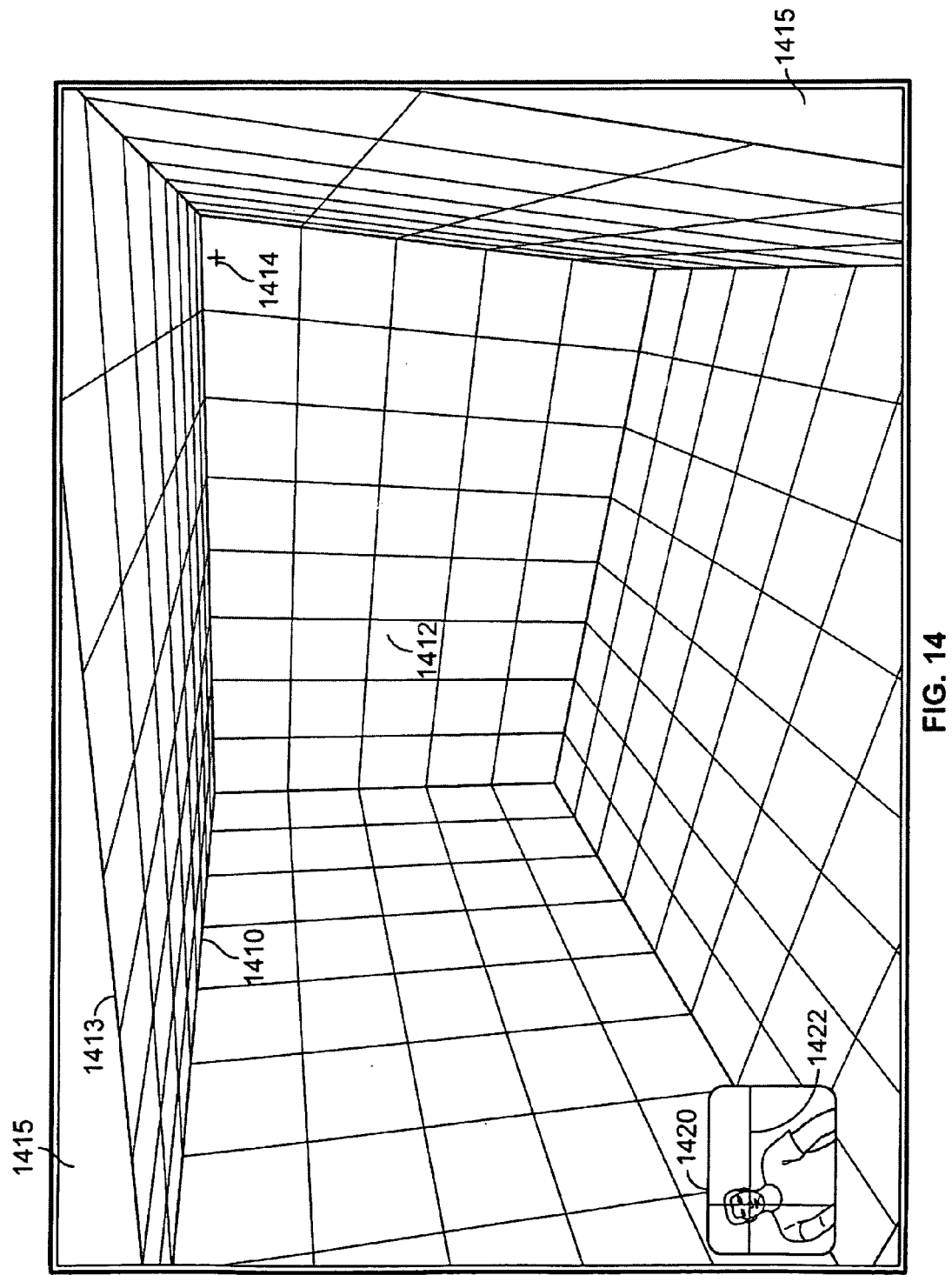
FIG. 14 is a schematic view of a display to which a perspective transform is applied when the user moves to the left in accordance with one embodiment of the invention.

In some embodiments, the electronic device may use a different approach for changing the perspective of objects displayed on the screen. For example, the electronic device may provide a true perspective transform of objects displayed on the display based on the detected position of the user. FIG. 13 is a schematic view of a display to which a perspective transform is applied when the user moves to the right in accordance with one embodiment of the invention. FIG. 14 is a schematic view of a display to which a perspective transform is applied when the user moves to the left in accordance with one embodiment of the invention. Displays 1300 and 1400 may include grids 1310 and 1410 depicting the displayed change in perspective, respectively (e.g., relative grid 210 of display 200, FIG. 2). As shown in displays 1300 and 1400, vanishing points 1314 and 1414, respectively, may be displaced based on the detected position of the user (e.g., indicated by crosshairs 1322 and 1422 depicted in windows 1320 and 1420, respectively).

To provide a more accurate perspective transform, both rear planes 1312 and 1412, and front planes 1313 and 1414, respectively, may rotate (e.g., move while stretching or compressing) based on the detected user position. In some embodiments, the user may move so far away from the center that grid 1410 and front plane 1413 may move into the display, thus causing display 1400 to include blank portions 1415. The electronic device may use any suitable approach for determining how to modify displays 1300 and 1400 (and their respective grids) based on a detected user position. In particular, the electronic device may use three-dimensional graphic engines (e.g., applying the OpenGL specification) to perform perspective projections of three-dimensional objects displayed on a two-dimensional display (e.g., display 1300 or 1400). In some embodiments, the electronic device may apply a three-dimensional transform matrix to elements of displays 1300 and 1400 based on the determined position of the user. For example, the electronic device may detect the current position of the user using the sensing mechanism and define, from the detected position, a location and rotation (e.g., using 3D vectors) from which to calculate the transform. The electronic device may then use the defined location and rotation vectors to transform each relevant point of a displayed object and create a perspective transform of the object.

The electronic device may use any suitable approach for correlating a sensed user position with a location and rotation from which to perform a transform. For example, the electronic device may assume that the user is at a particular distance from the display (e.g., a fixed distance in the range of 30 to 150 cm), and determine, from the detected position of the user as identified by the crosshairs (e.g., crosshairs 1322 or 1422) relative to the center of the sensing mechanism field of view, the angle from which the user is viewing the display (e.g., an angle defined by angles in each of the x-y, y-z and z-x planes). Alternatively, the electronic device may assume that the user is at a fixed angle relative to the display and determine, from the detected position of the user relative to the center of the sensing mechanism, the distance of the user from the display. As still another example, the electronic device may simultaneously determine both the distance of the user from the display and the angle of the user relative to the display. For example, the electronic device may determine the user's distance based on the size of one or more elements of the user (e.g., from the detected size of the user's eyes as compared to a standard). As another example the electronic device may determine the angle of the user relative to the display based on the detected distance between the user and the center of the sensing mechanism field of view, and on the determined distance of the user from the electronic device display. Using the determined angle and/or distance, the electronic device may calculate a perspective transform for an object displayed on the screen.

Figure 15:
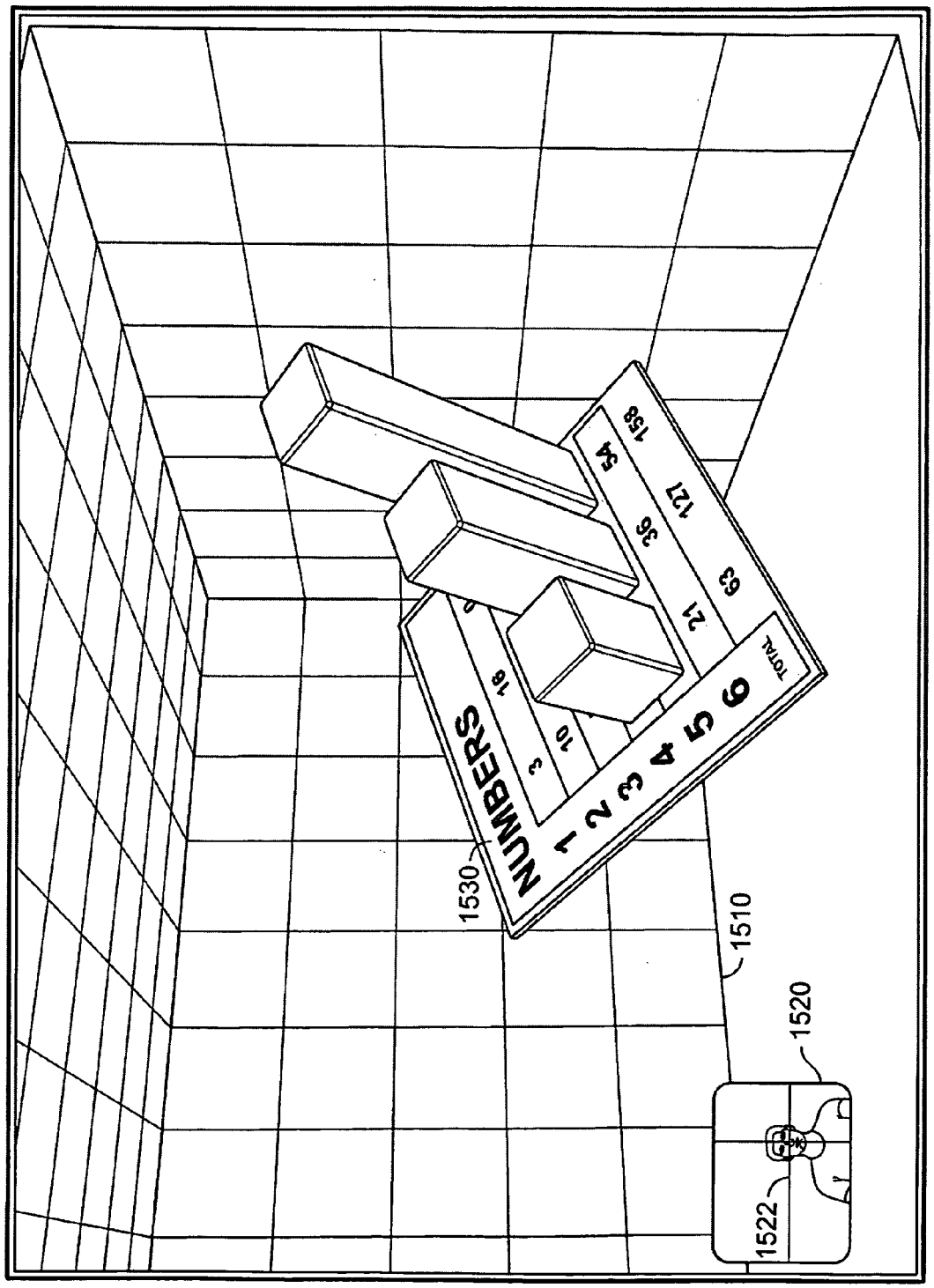
FIGS. 15 and 16 are schematic views of a three-dimensional object to which a perspective transform is applied when the user moves in accordance with one embodiment of the invention.
Figure 16:
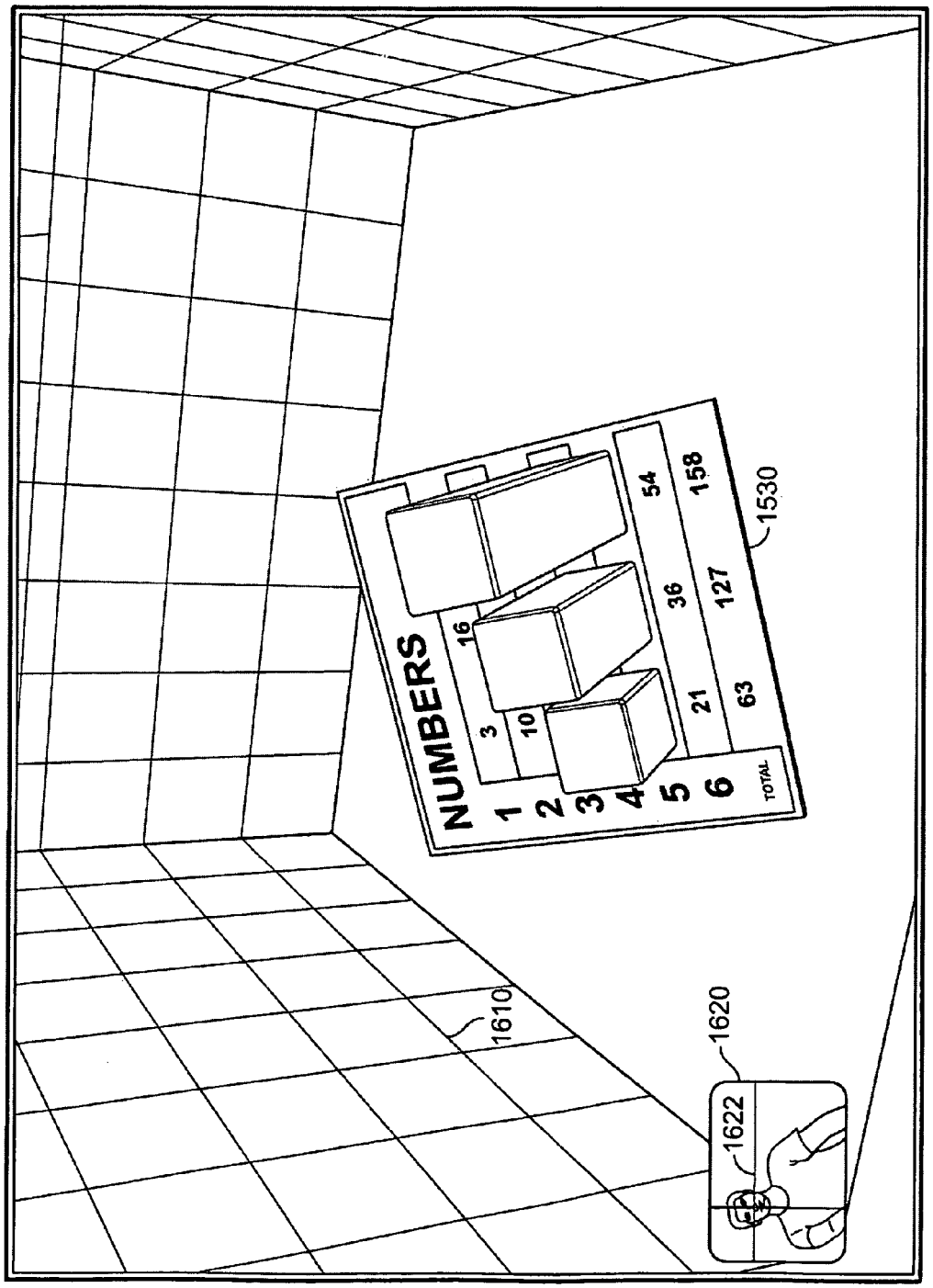

FIGS. 15 and 16 are schematic views of a three-dimensional object to which a perspective transform is applied when the user moves in accordance with one embodiment of the invention. Displays 1500 and 1600 may include three-dimensional icon 1530, for which different perspectives may be visible. Displays 1500 and 1600 may include grids 1510 and 1610, respectively that provide an indication of the current perspective provided by the electronic device. As shown in displays 1500 and 1600, when the user's perspective changes (e.g., indicated by crosshairs 1522 and 1622 in windows 1520 and 1620, respectively), the electronic device may perform a transform on icon 1530 to show different perspectives of the icon.

Figure 17:
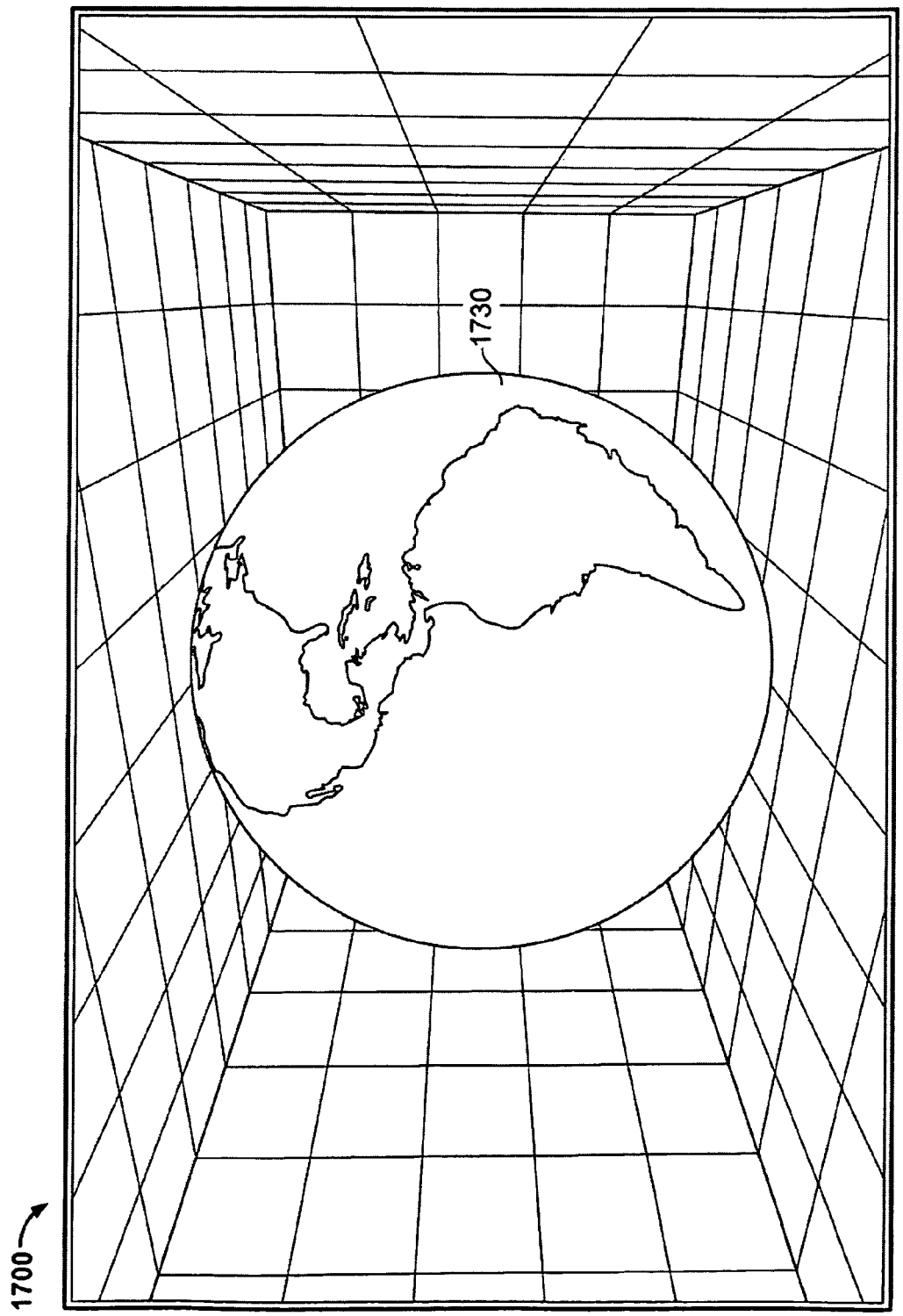
FIGS. 17 and 18 are schematic views of a three-dimensional object after the user manipulates the object using an input mechanism in accordance with one embodiment of the invention.
Figure 18:
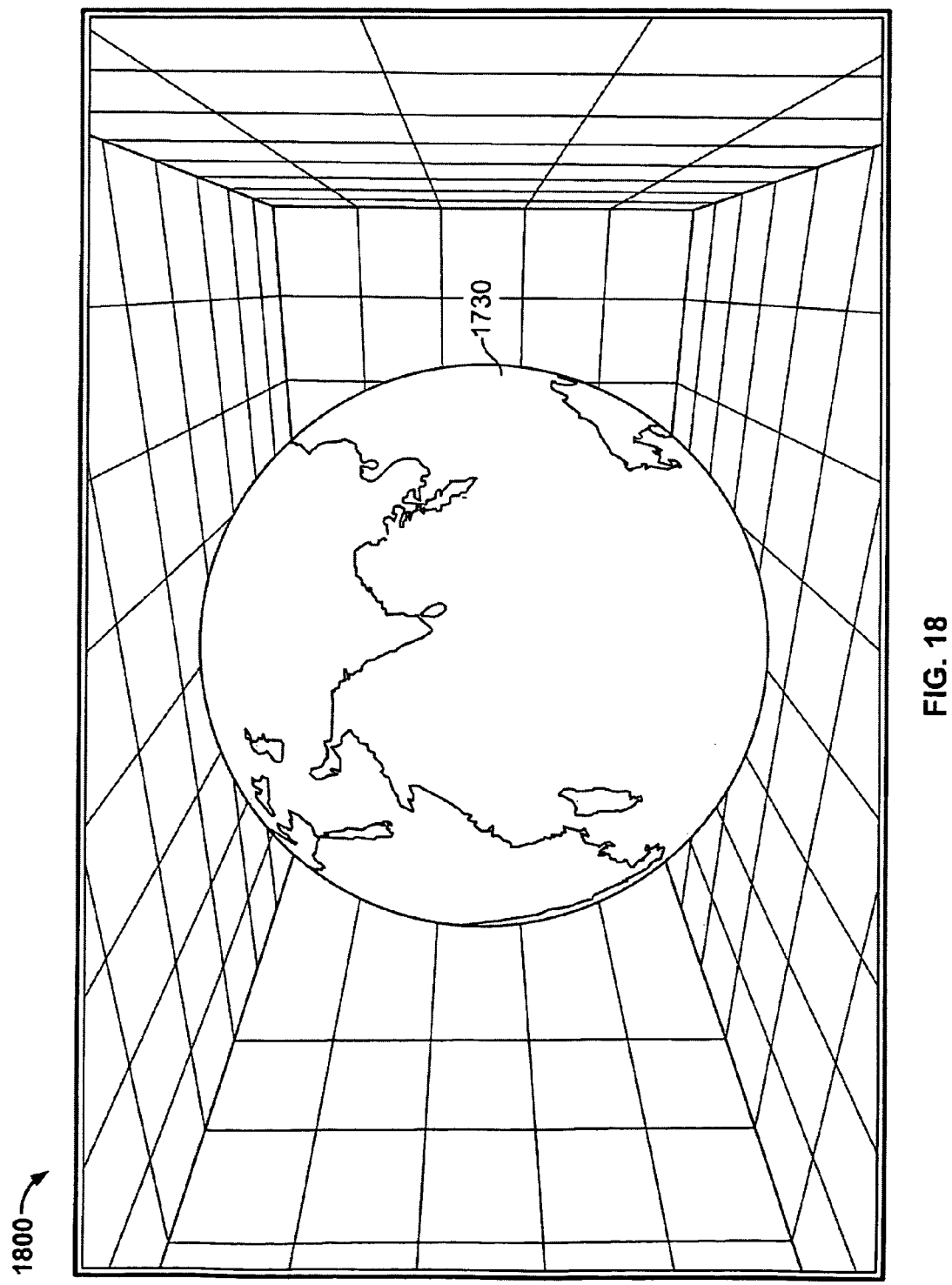

In some embodiments, a displayed three-dimensional object for which different perspectives are available may be selected or manipulated by the user. FIGS. 17 and 18 are schematic views of a three-dimensional object after the user manipulates the object using an input mechanism in accordance with one embodiment of the invention. Displays 1700 and 1800 may include three-dimensional object 1730, which may be viewed from any suitable perspective. In the example of FIGS. 17 and 18, object 1730 may be a globe. The electronic device may allow the user to view a different portion of object 1730 than is displayed in display 1700 using any suitable approach. For example, object 1730 may rotate or move (e.g., automatically). As another example, the user may move to change the displayed perspective of object 1730. As still another example, the user may select and rotate or move object 1730. For example, in a touch screen implementation, the user may wish to view more of the left surface of object 1730 than is visible simply by moving to the left (e.g., as shown in displays 1700 and 1800) and may therefore flick or pull object 1730 to rotate it towards the right (e.g., thus showing a different portion of object 1730, as shown in display 1800). In the example of FIGS. 17 and 18, a user flick of the globe on the touch screen may cause the globe to rotate.

In some embodiments, the electronic device may map elements of the environment detected by the sensing mechanism onto portions of displayed objects. For example, if a displayed object has a highly reflective surface, such as a mirror, the electronic device may reflect the environment detected by the sensing mechanism (e.g., a camera) onto the reflective surface. The manner in which the environment is reflected may depend on any suitable criteria, including for example the reflectivity of a surface (e.g., as quantified by a reflection coefficient), the geometry of the surface, indices of refraction (e.g., for liquids), the perspective or orientation from which the environment is received, or any other suitable criteria. By providing environmental feedback in the objects of the display, the user's experience with the electronic device and viewing objects on the display may be all the more realistic and pleasant.

Figure 19:
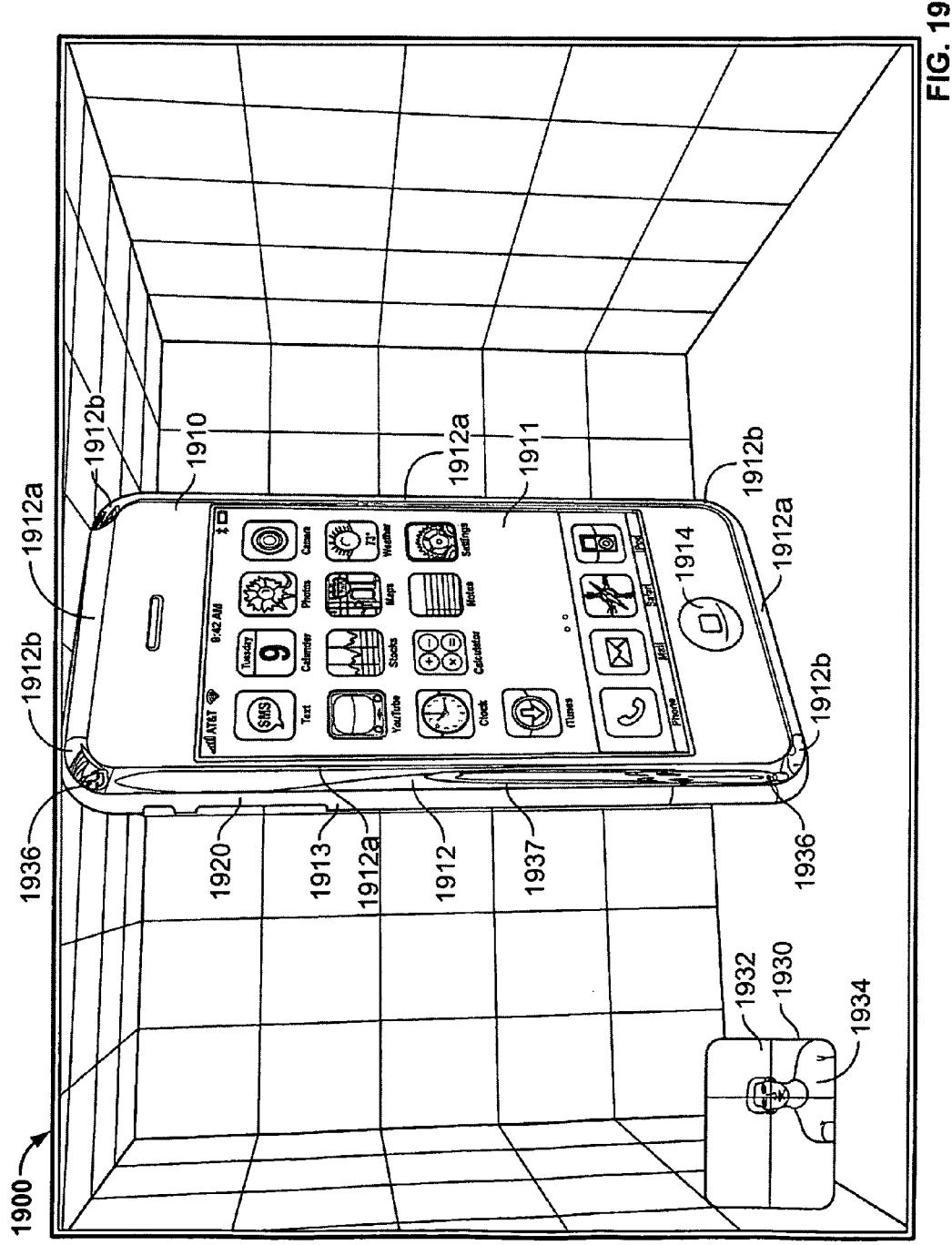
FIG. 19 is a schematic view of an object having reflective surfaces in accordance with one embodiment of the invention.

FIG. 19 is a schematic view of an object having reflective surfaces in accordance with one embodiment of the invention. Display 1900 may include three-dimensional object 1910, for example displayed in the center of the screen. Object 1910 may include any suitable property, such as for example surfaces with different optical or physical properties. Displayed objects may be constructed for display using any suitable approach. For example, the electronic device may construct each object as a combination of different surfaces (e.g., surfaces 1911, 1912, 1913 and 1914). Each surface may be defined as a combination of smaller surfaces all having the same physical properties. For example, surface 1912 (e.g., the bezel of object 1910) may be constructed from elongated surfaces 1912*a* and corner surfaces 1912*b*.

Figure 20:
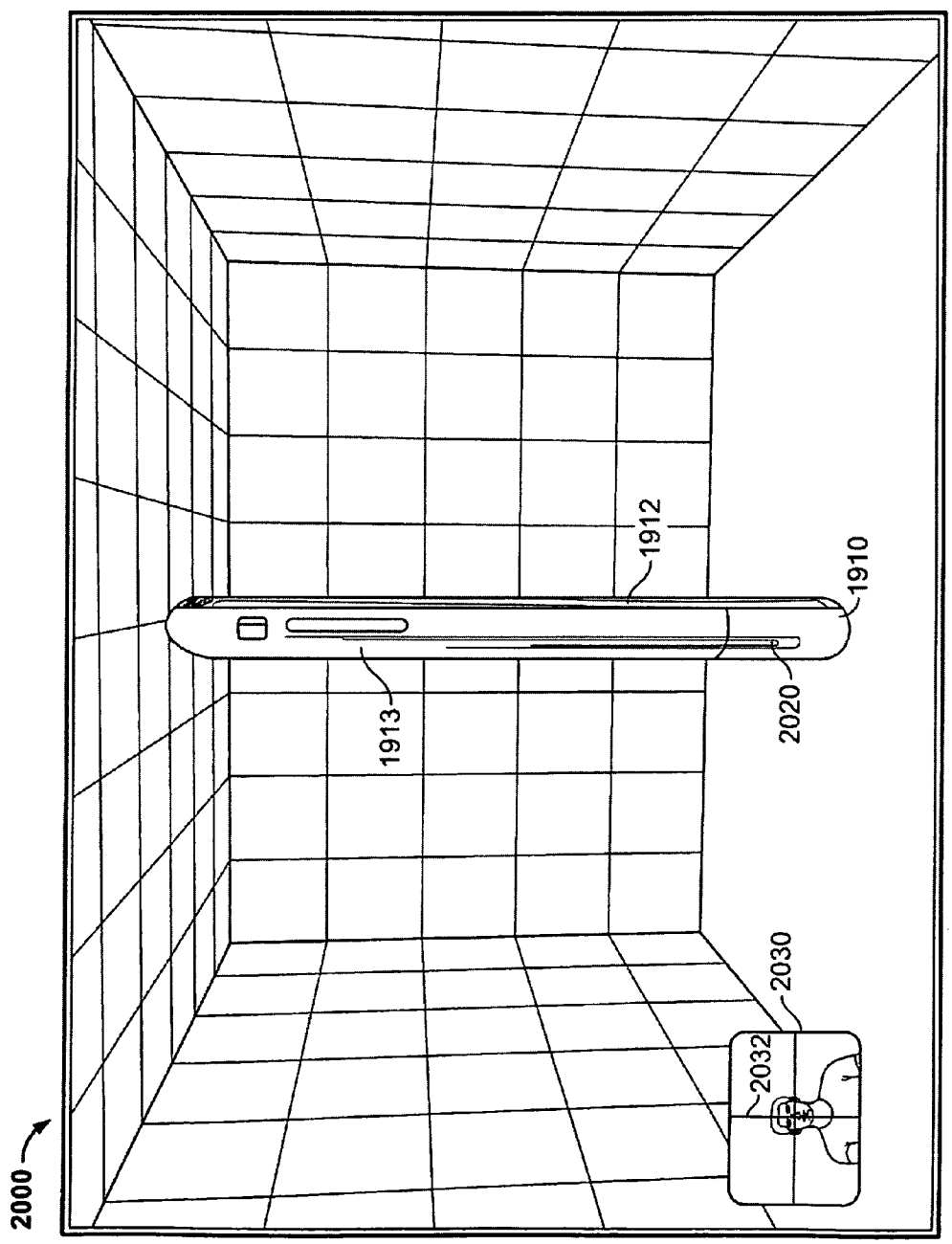
FIG. 20 is a schematic view of the display of FIG. 19 when the user moves the displayed object using an input mechanism in accordance with one embodiment of the invention.

The electronic device may associate physical properties with each surface using any suitable approach. For example, the electronic device may associate metadata for different physical properties with each surface of a displayed object (e.g., using a table). Suitable physical properties may include, for example, a reflection coefficient, hemispherical spectral reflectivity, a transmission coefficient, an index of refraction, a measure of the surface type (e.g., specular or diffuse surface), or any other suitable physical property. In some embodiments, the electronic device may associate other (e.g., non-optical) physical properties with object 1910 or surfaces of object 1910 to provide an accurate physical description of the object (e.g., assign a mass to object 1910 to determine the speed with which to rotate the object in response to an appropriate instruction, for example a flick of the user's finger on a touch screen). For example, FIG. 20 is a schematic view of the display of FIG. 19 when the user moves the displayed object in accordance with one embodiment of the invention. As shown in display 2000, object 1910 may be rotated relative its position in display 1900.

Using the physical properties of each surface, the electronic device may apply the detected environment (e.g., detected by the sensing mechanism, such as a lens) to the displayed object. In some embodiments, the electronic device may first determine the user's position (e.g., from the output of the sensing mechanism) relative to the screen to determine the angle and location from which the user should appear to see light impacting the displayed object. For example, the electronic device may define one or more sources of directed light (e.g., a light source opposite the center of the display), or may instead or in addition define a diffuse or generalized light source for the object. Once the electronic device has determined the position of the light source and the position of the user, the electronic device may map the light to each surface of the electronic device, and determine from the physical properties of each surface, as well as the shape and orientation of each surface, the manner in which light will reflect from each surface (e.g., using Fresnel equations). Because the processing power and time required to trace each ray of light as it moves through or off the displayed object and reaches the user's eye may be too large for a consumer electronic device, the electronic device may use any suitable approximation to allow the electronic device to change the display quickly while providing a reasonably accurate representation of the light's reflection. For example, display 1900 may include reflection 1920 depicting light reflecting from object 1910 in the orientation of display 1900, while display 2000 may include reflection 2020 depicting the same light reflecting from a different portion of object 1910 (e.g., because object 1910 was rotated).

In some embodiments, the electronic device may leverage images or other media received by the sensing mechanism to provide reflections of the user or of the user's surroundings in the displayed object. For example, similar to mapping light onto the displayed object based on the user's perspective (e.g., detected by the sensing mechanism), the electronic device may map the actual environment detected by the sensing mechanism on the electronic device. For example, the sensing mechanism may detect image 1932, depicted in window 1930. Image 1932 may include a background (not shown in the figure) and user 1934. Once the electronic device has determined the manner in which to map light onto the object (or instead of or prior to determining how to map light), the electronic device may map each element of detected image 1932 on object 1910. The electronic device may determine where to map each portion of image 1932 on object 1910 using any suitable approach, including for example associating the detected image with the particular perspective from which the user is viewing object 1910 to determine the proper projection of the image on the object. In addition, the electronic device may determine, from the physical properties and shape of each surface of the object, the manner in which image 1932 may be reflected on different surfaces of object 1910. For example, surface 1912 may be a polished metal surface that is highly reflective, and may reflect image 1932 well. As shown in display 1900, surfaces 1912b, which may be curved, may include reflections 1936 of user 1934. Surface 1912a, which is substantially straight, may include a different reflection 1937 of user 1934. Each reflection 1936 and 1937 may be distorted, for example based on the shape of each surface from which the image of user 1934 is being reflected. Other surfaces, for example surface 1913, may be diffuse such that light may be reflected, but no discernible part of image 1932 (e.g., as shown in FIG. 20, where the user's position relative display 2000 and the orientation and shape of surface 1912 is such that the detected image is not reflected back to the user).

Figure 21:
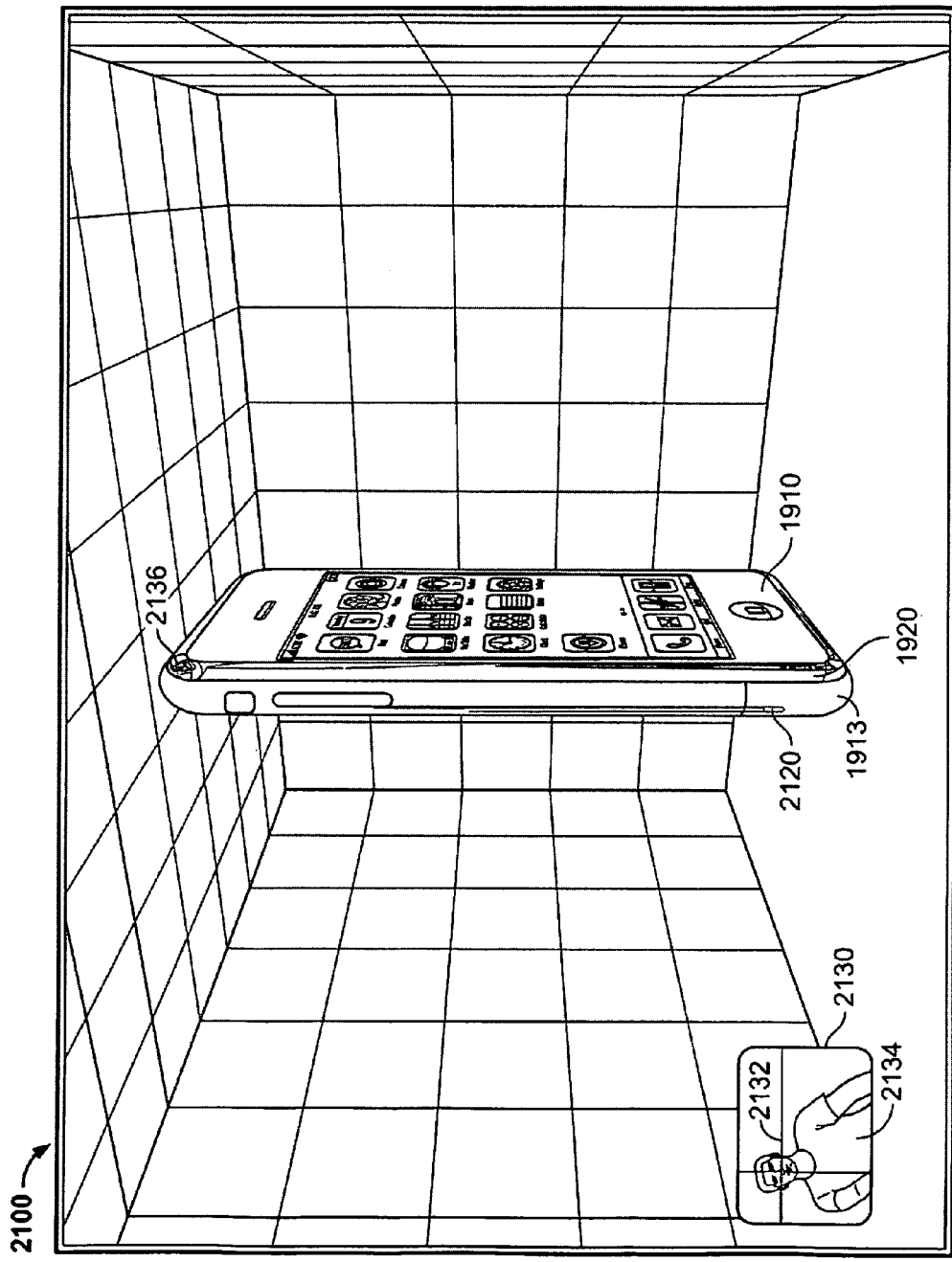
FIG. 21 is a schematic view of the illustrative display of FIG. 20 when the user's position changes in accordance with one embodiment of the invention.

In some embodiments, the electronic device may modify the displayed reflection or change the light effects as the user moves relative to the display (e.g., as determined by the sensing mechanism) to reflect the current position of the user. FIG. 21 is a schematic view of the illustrative display of FIG. 20 when the user's position changes in accordance with one embodiment of the invention. Display 2100 may include object 1910. As shown by comparing to display 2000, the perspective of object 1910 in display 2100 may have changed to reflect the current position of the user (e.g., indicated by the relative position of crosshairs 2032 in window 2030, FIG. 20, and crosshairs 2132 in window 2130). In the example of FIG. 21, the electronic device used a perspective transform to modify the display of object 1910. It will be understood however that any other approach may have been used to modify the displayed object.

Because both object 1910 and the user's perspective have changed, the manner in which light reflects off the object and reflections of the user's environment off the object may also have changed. For example, reflection 2120 from surface 1913 may be different from reflection 2020 (FIG. 20) from the same surface. As another example, while object 1910 in display 2000 may not have had any reflections of the user (e.g., because the displayed surfaces from which the environment could reflect were diffuse surfaces), in display 2100 surface 1912 may include reflection 2136 depicting user 2134 detected by the sensing mechanism. The electronic device may change the light and environment reflections as the user moves using any suitable approach, including for example in near real time (e.g., so that the reflections change as the user moves, thus enhancing the realistic display of the object), or once the user has stopped moving (e.g., due to limits on the resources necessary to change the reflections of the displayed object as it moves).

The electronic device may determine when to apply either the parallax, perspective or any other suitable transform (e.g., a different transform for changing the appearance of an object based on the position of the viewer) using any suitable approach. In some embodiments, the parallax transform may be applied to small three-dimensional objects, or to objects located in or near a front plane of the display. For example, the parallax transform may be advantageously applied to the dock, or to any other menu or object displayed on an upper layer of the display. As another example, the parallax transform may be advantageously applied to cause two-dimensional objects (e.g., application windows) to slide across the display based on the user's perspective. In some embodiments, the perspective transform may be applied to large objects or objects located in intermediate planes or near the rear plane of the display. For example, the perspective transform may be applied to objects displayed in application windows or in full screen (e.g., three-dimensional objects displayed in an Internet browser, or three-dimensional objects created using a 3D rendering or design application).

In some embodiments, each object may specify which transform to use for its display. For example, each object may include metadata, registry settings, or any other setting associating a particular transform with the object. Then, the electronic device may transform the perspective of each displayed object based on each object's specified transform (e.g., such that the display may simultaneously include different transforms). Alternatively, the electronic device may associate particular transforms based on the position of an object on the display (e.g., parallax transform for the dock and two-dimensional windows, and perspective transform for all other three-dimensional objects). As still another alternative, the electronic device may apply one of parallax and perspective transforms to every object displayed on the screen. For example, the electronic device may apply the transform associated with a majority of objects. As another example, the electronic device may apply a dominant transform (e.g., always apply parallax if there is a single object for which parallax is applied). In some embodiments, some objects may not be transformed based on the perspective of the user. Such objects may include, for example, two-dimensional objects (e.g., other than displaceable windows), objects displayed on a background or desktop, a background image, text, or any other object for which a change of perspective may not be desirable.

The electronic device may use any suitable approach for transforming different objects using different transforms. For example, the electronic device may construct the display by assigning each object to a different layer, where each layer depicts a different depth in the display. In response to the detecting that the user's position has changed, the electronic device may transform the object of each layer using the transform method (e.g., parallax or perspective view) associated with the object, and blend or overlay each transformed object in the order specified by the layer order. This may allow the electronic device to change the perspective of different objects using different approaches simultaneously on the same display. With such an approach, the electronic device may provide the user with a smooth experience that takes advantage of the benefits of each transform approach for the display.

The electronic device may enable transformations for changing the user's perspective using any suitable approach. In some embodiments, transformations may be performed only when the sensing mechanism is enabled. For example, if a camera is not enabled, or if a camera is not able to detect the user (e.g., because the user is out of the frame of view, or because the background and user are too similar), the electronic device may not perform transformations. In some embodiments, transformations may only be available when three-dimensional objects are displayed. For example, transformations may only be enabled when the user navigates to an application screen (e.g., a full screen view of a three-dimensional icon, or a request to display a dock including at least one three-dimensional icon).

In some embodiments, transformations may be enabled based on the application or objects displayed. For example, particular applications, such as video games (e.g., a car racing game or other game in which the user plays in the first person) may be associated with particular transformations and enable particular transformations based on the current mode of the application. In one approach, a user of a car racing or flight simulator video game may be able to look out different windows, or see different perspectives of the track or sky based on the user's position relative a sensing mechanism. In another approach, a user viewing a three-dimensional object (e.g., using a web-based shopping application) may view different perspectives of the object as the user moves relative to the display screen. In still another approach, a user creating a three-dimensional object using a design program may view different perspectives of the created object by moving relative to the sensing mechanism.

In some embodiments, the user may select to enable or disable one or more transformation modes. For example, the electronic device may direct the display to display an option for enable or disabling transformations, or the electronic device may associate a particular input from an input mechanism (e.g., a key sequence from a keyboard) with options for enabling and disabling transformations. This may allow the user to change the perspective of displayed objects when it is convenient or useful for the user, without risking antagonizing the user by modifying displayed objects (e.g., a displayed word processing, spreadsheet or presentation application window) when it is of less interest or less convenient for the user.

Figure 22:
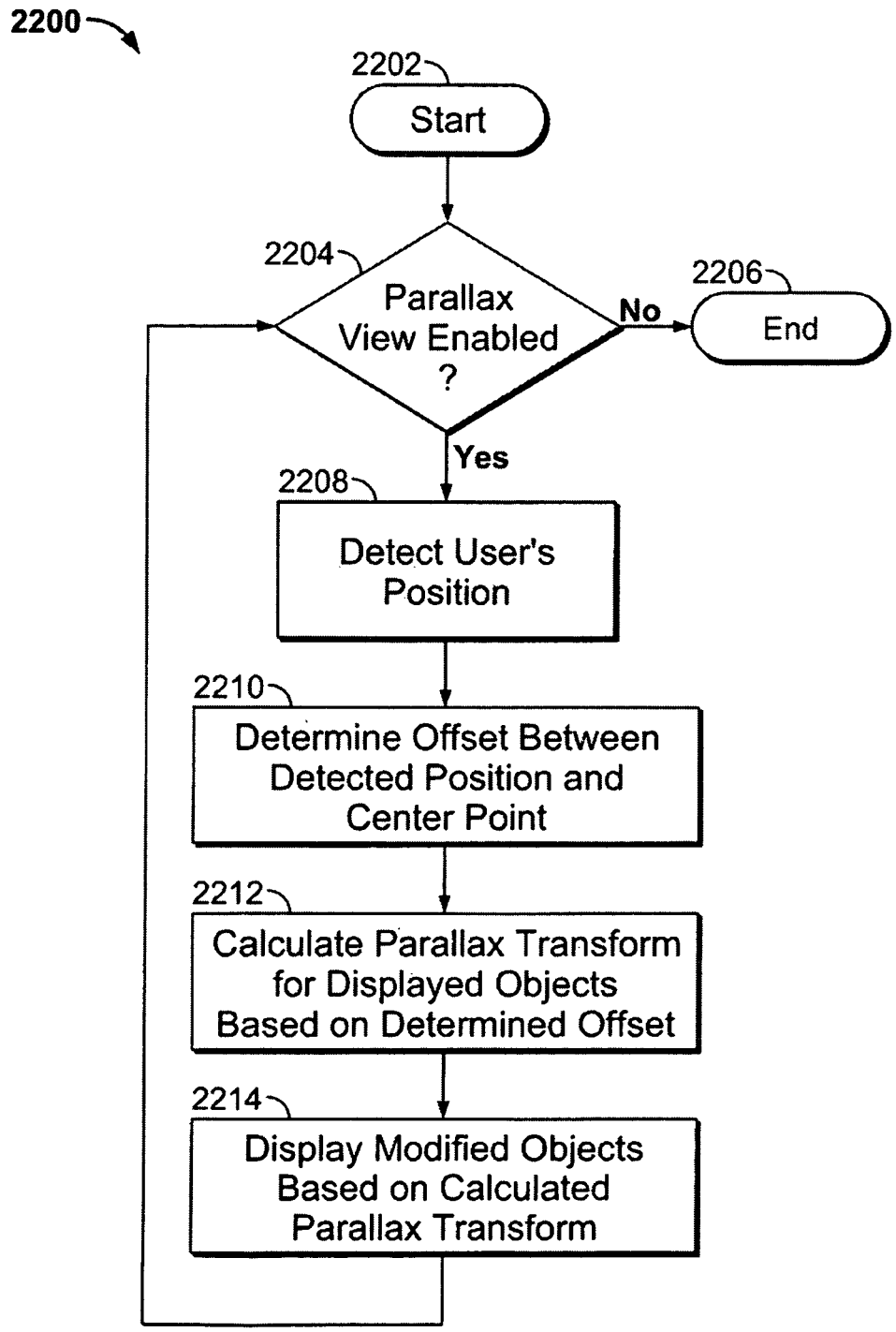
FIG. 22 is a flowchart of an illustrative process for enabling a parallax transform of an object in accordance with one embodiment of the invention.

The following flowcharts will describe a number of processes used to provide three-dimensional views of objects displayed on a display based on the detected position of the user. FIG. 22 is a flowchart of an illustrative process for enabling a parallax transform of an object in accordance with one embodiment of the invention. Process 2200 may begin at step 2202. At step 2204, the electronic device may determine whether a parallax view is enabled. For example, the electronic device may determine whether an object displayed on screen is associated with a parallax transform. As another example, the electronic device may determine whether the user enabled the parallax transform. If the electronic device determines that the parallax view is not enabled, process 2200 may move to step 2206 and end.

If, at step 2204, the electronic device instead determines that the parallax view is enabled, process 2200 may move to step 2208. At step 2208, the electronic device may detect the user's position. For example, the electronic device may process the output of a sensing mechanism to detect the user' position (e.g., the position of the user's head). The sensing mechanism may use any suitable approach for detecting the user, including for example comparing the image received by a lens (e.g., if the sensing mechanism comprises a camera) with a library of user features (e.g., to differentiate the user's head from the background). At step 2210, the electronic device may determine the offset between the detected position of the user and a center point of the sensing mechanism. For example, the electronic device may determine the angle and distance between the detected position (e.g., as identified by crosshairs in displayed window) and a defined center point of the sensing mechanism (e.g., the center of the sensing mechanism frame of view).

At step 2212, the electronic device may calculate the parallax transform for displayed objects based on the determined offset. For example, the electronic device may determine the amount to shear (e.g., stretch or compress) each line of a displayed object based on the determined amount by which the user moved (e.g., based on the determined change of the user's perspective). The electronic device may use any suitable approach for correlating a determined offset of the user with a change in the display characteristics of displayed objects, including for example linear and non-linear correlations. At step 2214, the electronic device may display modified objects based on the calculated parallax transform. For example, the electronic device may display rotated objects such that the objects appear to be viewed from the perspective of the detected user position. Process 2200 may then return to step 2204 and determine whether the parallax view is still enabled.

Figure 23:
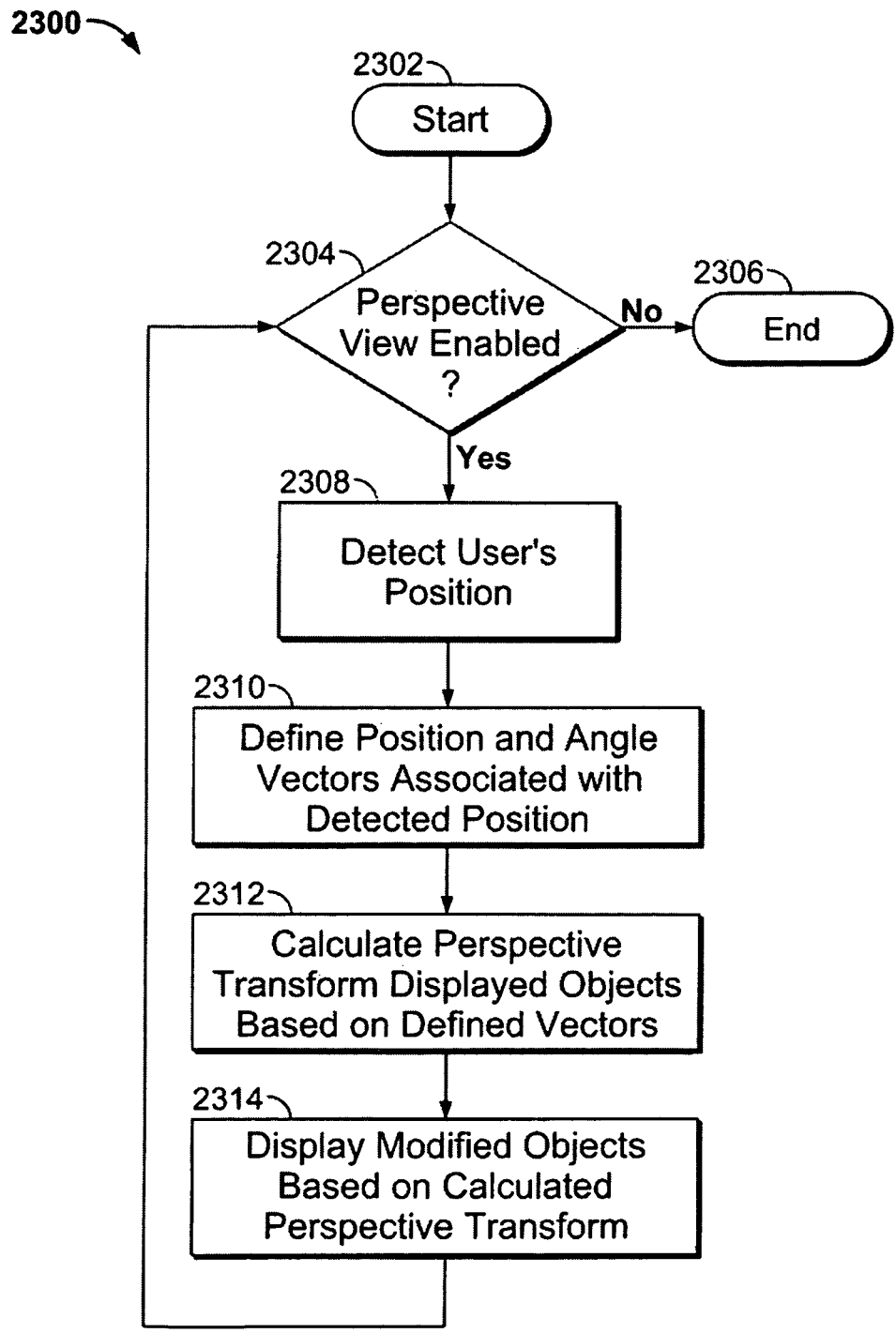
FIG. 23 is a flowchart of an illustrative process for enabling a perspective transform of an object in accordance with one embodiment of the invention.

FIG. 23 is a flowchart of an illustrative process for enabling a perspective transform of an object in accordance with one embodiment of the invention. Process 2300 may begin at step 2302. At step 2304, the electronic device may determine whether a perspective view is enabled. For example, the electronic device may determine whether an object displayed on screen is associated with a perspective transform. As another example, the electronic device may determine whether the user enabled the perspective transform. If the electronic device determines that the perspective view is not enabled, process 2300 may move to step 2306 and end.

If, at step 2304, the electronic device instead determines that the perspective view is enabled, process 2300 may move to step 2308. At step 2308, the electronic device may detect the user's position. For example, the electronic device may process the output of a sensing mechanism to detect the user' position (e.g., the position of the user's head). The sensing mechanism may use any suitable approach for detecting the user, including for example comparing the image received by a lens (e.g., if the sensing mechanism comprises a camera) with a library of user features (e.g., to differentiate the user's head from the background). At step 2310, the electronic device may define position and angle vectors associated with the detected position. For example, the electronic device may first determine the distance and angle between the detected position and the center of the sensing mechanism field of view in the sensing mechanism plane (e.g., determine the relative position of the center point and the projection of the user's position on a plane parallel to the display). The electronic device may then calculate, in three-dimensional space, the coordinates of the user relative to the sensing mechanism or the display, or alternatively calculate the distance and angle of the user's position relative to the sensing mechanism. The electronic device may organize or store the determined position and angle information as three-dimensional vectors (e.g., x, y and z positions and x-y, y-z, and z-x angles).

At step 2312, the electronic device may calculate the perspective transform for displayed objects based on the defined vectors. For example, the electronic device may perform a perspective transform matrix calculation (e.g., matrix multiplication in three dimensions) to determine the new position for one or more point of the object for which a transformation is needed. The electronic device may use the defined vectors in the perspective transform calculation to specify the perspective from which the displayed object should be displayed. At step 2314, the electronic device may display modified objects based on the calculated perspective transform. For example, the electronic device may display rotated objects such that the objects appear to be viewed from the perspective of the detected user position. Process 2300 may then return to step 2304 and determine whether the perspective view is still enabled.

Figure 24:
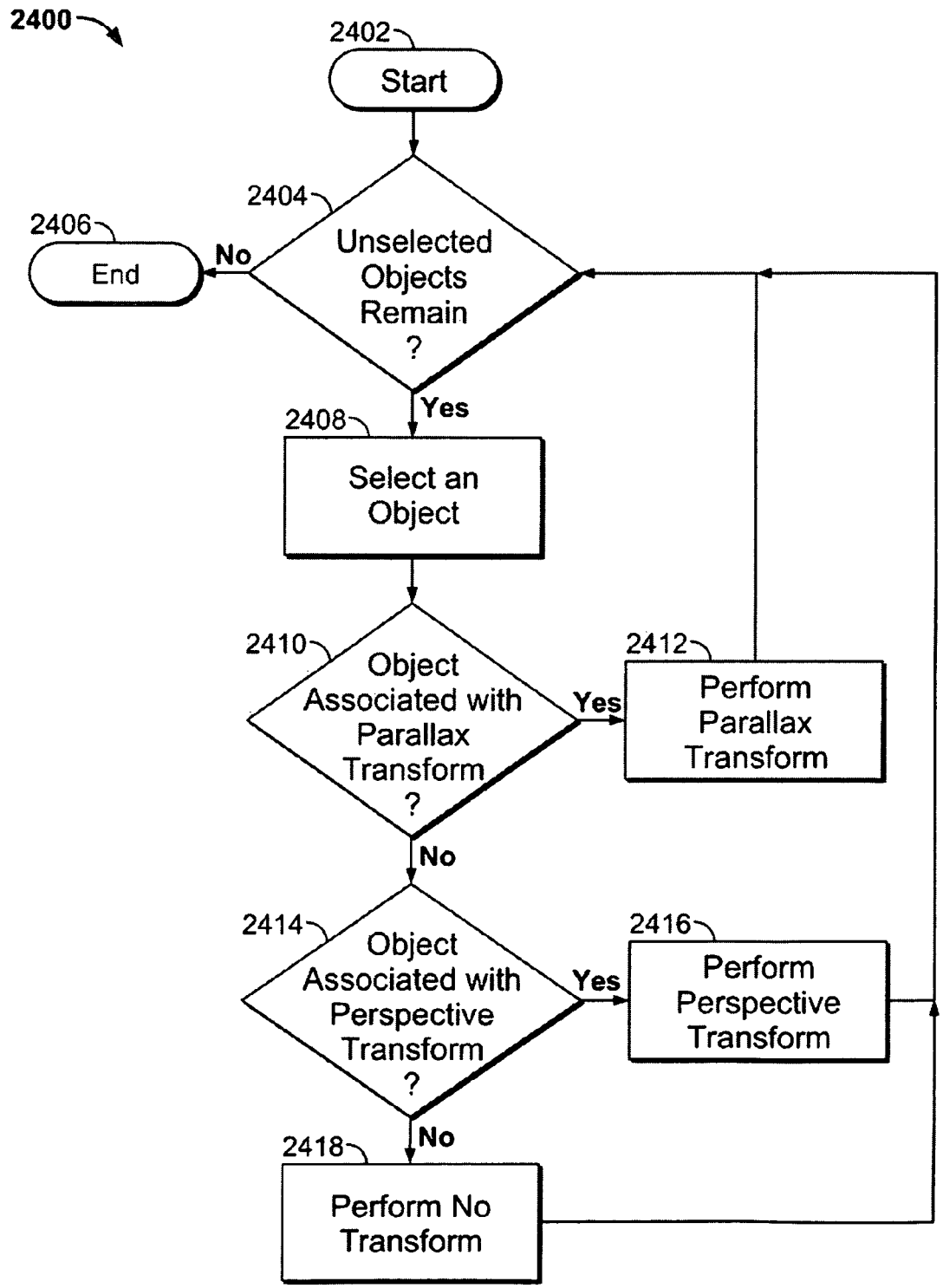
FIG. 24 is a flowchart of an illustrative process for changing the perspective of objects displayed by an electronic device in accordance with one embodiment of the invention.

FIG. 24 is a flowchart of an illustrative process for changing the perspective of objects displayed by an electronic device in accordance with one embodiment of the invention.

Process 2400 may begin at step 2402. At step 2404, the electronic device may determine whether all objects displayed by the electronic device have been selected. For example, the electronic device may query an image queue to determine whether every object in the image queue has been selected. If the electronic device determines that every object displayed by the electronic device has been selected, process 2400 may move to step 2406 and end.

If, at step 2404, the electronic device instead determines that at least one object displayed by the electronic device has not yet been selected, process 2400 may move to step 2408. At step 2408, the electronic device may select an object. For example, the electronic device may select an object from an image queue (e.g., in an OpenGL implementation). At step 2410, the electronic device may determine whether the selected object is associated with a parallax transform. For example, the electronic device may review metadata associated with the selected object. As another example, the electronic device may determine the location, depth or size of the selected object in the display (e.g., where parallax transforms are applied to objects that are located near the front plane of the display or to smaller three-dimensional objects). As still another example, the electronic device may determine whether the object is a two-dimensional object to which a perspective transform may be applied (e.g., displayed application windows). If the electronic device determines that the selected object is associated with a parallax transform, process 2400 may move to step 2412. At step 2412, the electronic device may perform a parallax transform on the selected object. For example, the electronic device may perform process 2200 (FIG. 22) with the selected object. Process 2400 may then return to step 2404 to determine whether other unselected displayed objects remain.

If, at step 2410, the electronic device instead determines that the selected object is not associated with a parallax transform, process 2400 may move to step 2414. At step 2414, the electronic device may determine whether the selected object is associated with a perspective transform. For example, the electronic device may review metadata associated with the selected object. As another example, the electronic device may determine the location, depth or size of the selected object in the display (e.g., where perspective transforms are applied to objects that are located away from the front plane of the display or to larger three-dimensional objects). If the electronic device determines that the selected object is associated with a perspective transform, process 2400 may move to step 2416. At step 2416, the electronic device may perform a perspective transform on the selected object. For example, the electronic device may perform process 2300 (FIG. 23) with the selected object. Process 2400 may then return to step 2404 to determine whether other unselected displayed objects remain.

If, at step 2414, the electronic device instead determines that the selected object is not associated with a perspective transform, process 2400 may move to step 2418. At step 2418, the electronic device may perform no transform on the selected object. For example, if the object is a background or desktop image, or an icon displayed on the desktop, the electronic device may not change the perspective of the selected object. Process 2400 may then return to step 2404 to determine whether other unselected displayed objects remain.

Figure 25:
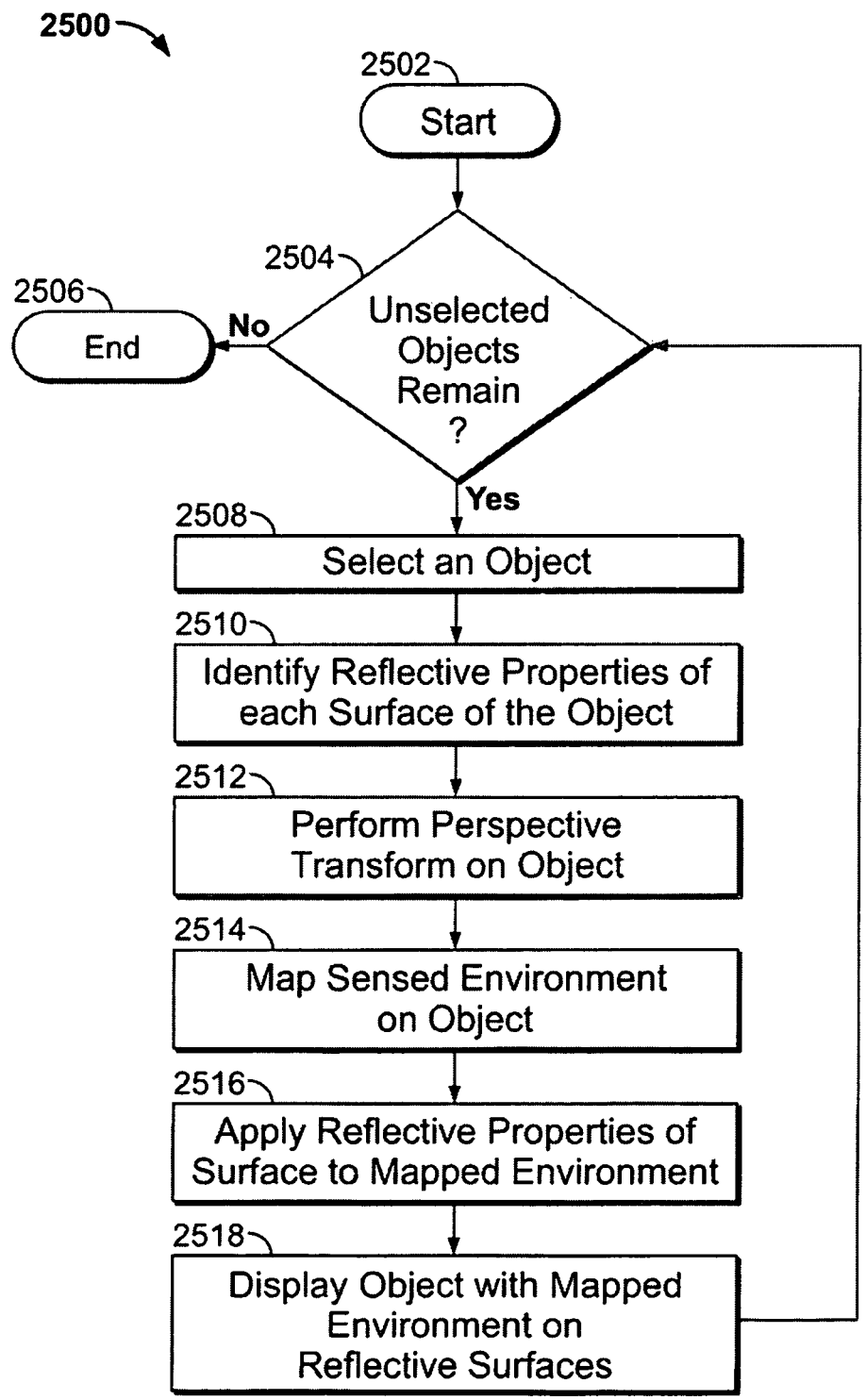
FIG. 25 is a flowchart of an illustrative flowchart for adding reflections to displayed objects in accordance with one embodiment of the invention.

FIG. 25 is a flowchart of an illustrative flowchart for adding reflections to displayed objects in accordance with one embodiment of the invention. Process 2500 may begin at step 2502. At step 2504, the electronic device may determine whether all objects displayed by the electronic device have been selected. For example, the electronic device may query an image queue to determine whether every object in the image queue has been selected. If the electronic device determines that every object displayed by the electronic device has been selected, process 2500 may move to step 2506 and end.

If, at step 2504, the electronic device instead determines that at least one object displayed by the electronic device has not yet been selected, process 2500 may move to step 2508. At step 2508, the electronic device may select an object. For example, the electronic device may select an object from an image queue (e.g., in an OpenGL implementation). At step 2510, the electronic device may identify reflective properties of each surface of the object. For example, the electronic device may determine reflection and refraction characteristics of each surface from metadata associated with the surfaces. At step 2512, the electronic device may perform a perspective transform on the object. For example, the electronic device may perform process 2300 (FIG. 23) on the object. In some embodiments, the electronic device may instead or in addition perform a parallax transform on the object (e.g., by performing process 2200, FIG. 22).

At step 2514, the electronic device may map a sensed environment on the object. For example, the electronic device may detect the environment from which the user is viewing the object (e.g., using a sensing mechanism such as a camera), and map the detected environment on the object. In an implementation where the sensing mechanism is a camera, the electronic device may map the camera image on the object (e.g., such that the image is distorted based on the shape of the object). At step 2516, the electronic device may apply the reflective properties of the surfaces of the selected object to the mapped environment. For example, the electronic device may remove traces of the mapped environment on surfaces of the object that have low reflective properties (e.g., plastic surfaces), while reflecting the environment on surfaces of the object that have high reflective properties (e.g., chrome or metallic surfaces). At step 2518, the electronic device may display the object with the environment mapped on the object based on the determined reflectivity of each surface. Process 2500 may then move to step 2504 to determine whether other unselected displayed objects remain.

The above described embodiments of the invention are presented for the purposes of illustration and not of limitation, and the present invention is limited only by the claims which follow.

What is claimed is:

1. An electronic device for displaying three-dimensional objects, comprising:
   a display;
   a sensing mechanism; and
   control circuitry that is operative to:
   direct the sensing mechanism to capture a first image of a user of the electronic device within a field of view of the sensing mechanism;
   detect a first position of the user with respect to a component of the electronic device from the captured first image;
   in response to the first position being detected, direct the display to concurrently display:
   a three-dimensional object from a first perspective, wherein at least a portion of the three-dimensional object from the first perspective comprises a first reflective surface and at least a portion of the captured first image is applied to at least a portion of the first reflective surface when the three-dimensional object from the first perspective is displayed; and a first depiction comprising a window and an element at a first element position within the window, wherein the first element position of the element with respect to the boundaries of the window is based on the detected first position of the user with respect to the component of the electronic device;

after the display is directed to display the three-dimensional object from the first perspective, direct the sensing mechanism to capture a second image of the user within the field of view of the sensing mechanism;

detect a current second position of the user with respect to the component of the electronic device from the captured second image, wherein the detected current second position is different than the detected first position;

in response to the second position being detected, transform the displayed three-dimensional object by:
changing the displayed three-dimensional object from the first perspective to a second perspective based on a difference between the first position and the detected current second position, wherein at least a portion of the changed three-dimensional object comprises a second reflective surface; and
applying at least a portion of the captured second image to at least a portion of the second reflective surface;

direct the display to concurrently display:
the transformed three-dimensional object; and
a second depiction comprising the window and the element at a second element position within the window, wherein the second element position of the element with respect to the boundaries of the window is based on the detected current second position of the user with respect to the component of the electronic device;

detect that a position of the user within the field of view of the sensing mechanism has not changed more than a defined threshold amount within a specific period of time; and remove any depiction of the window from the display when it has been detected that the position of the user within the field of view of the sensing mechanism has not changed more than the defined threshold amount within the specific period of time.

2. The electronic device of claim 1, wherein the control circuitry is further operative to:
after the display is directed to display the transformed three-dimensional object, direct the sensing mechanism to capture a third image of the user;
detect a third position of the user with respect to the electronic device from the captured third image;
in response to the third position being detected, re-transform the transformed three-dimensional object by:
re-changing the transformed three-dimensional object from the second perspective to a third perspective based on a difference between the second position and the third position, wherein at least a portion of the re-changed three-dimensional object comprises a third reflective surface; and
applying at least a portion of the captured third image to at least a portion of the third reflective surface; and
direct the display to display the re-transformed three-dimensional object.

3. The electronic device of claim 1, wherein the control circuitry is operative to change the displayed three-dimensional object by performing a parallax transform on the displayed three-dimensional object.

4. The electronic device of claim 1, wherein the control circuitry is operative to change the displayed three-dimensional object by performing a perspective transform on the displayed three-dimensional object.

5. The electronic device of claim 1, wherein the control circuitry is further operative to:
direct the display to display another three-dimensional object;
transform the displayed another three-dimensional object based on the detected second position; and
direct the display to display the transformed another three-dimensional object.

6. The electronic device of claim 5, wherein the control circuitry is operative to:
transform the displayed three-dimensional object by performing a first type of transform; and
transform the displayed another three-dimensional object by performing a second type of transform.

7. The electronic device of claim 6, wherein the first type of transform is different from the second type of transform.

8. The electronic device of claim 6, wherein the control circuitry is operative to transform at least one of the displayed three-dimensional object and the displayed another three-dimensional object based on a display position of the displayed three-dimensional object relative to a display position of the displayed another three-dimensional object.

9. The electronic device of claim 6, wherein:
the first type of transform comprises a parallax transform; and
the second type of transform comprises a perspective transform.

10. The electronic device of claim 1, wherein the sensing mechanism comprises a lens.

11. The electronic device of claim 1, wherein:
the second reflective surface comprises a curve; and
the applying comprises applying the at least a portion of the captured second image based on the curve.

12. The electronic device of claim 1, wherein the boundaries of the window represent the boundaries of the component of the electronic device.

13. The electronic device of claim 1, wherein the component of the electronic device is the display.

14. The electronic device of claim 1, wherein the component of the electronic device is the sensing mechanism.

15. The electronic device of claim 14, wherein the boundaries of the window represent the field of view of the sensing mechanism.

16. The electronic device of claim 1, wherein the first depiction further comprises at least a portion of the captured first image within the window.

17. The electronic device of claim 16, wherein the second depiction further comprises at least a portion of the captured second image within the window.

18. The electronic device of claim 1, wherein:
the first depiction further comprises a first representation of the user within the window; and
the first element position of the element is placed on a particular feature of the user provided by the first representation of the user.

19. The electronic device of claim 18, wherein:
the second depiction further comprises a second representation of the user within the window; and
the second element position of the element is placed on the particular feature of the user provided by the second representation of the user.

20. The electronic device of claim 19, wherein the particular feature is the face of the user.

21. The electronic device of claim 20, wherein the element comprises an intersection of crosshairs.

22. The electronic device of claim 1, wherein the element comprises an intersection of crosshairs.

23. A method comprising:
capturing a first image of an environment of an electronic device with a sensing mechanism of the electronic device;
detecting with the electronic device a first position of a user within a field of view of the sensing mechanism with respect to a component of the electronic device from the captured first image;
in response to detecting the first position, concurrently displaying with a display of the electronic device:
a three-dimensional object from a first perspective, wherein at least a portion of the three-dimensional object from the first perspective comprises a first reflective surface and at least a portion of the captured first image is applied to at least a portion of the first reflective surface when the three-dimensional object from the first perspective is displayed; and
a first depiction comprising a window and an element at a first element position within the window, wherein the first element position of the element with respect to the boundaries of the window is based on the detected first position of the user with respect to the component of the electronic device;
once the three-dimensional object is displayed from the first perspective, capturing a second image of the environment with the sensing mechanism;
detecting with the electronic device a second position of the user within the field of view of the sensing mechanism with respect to the component of the electronic device from the captured second image, wherein the detected second position is different than the detected first position;
in response to detecting the second position, transforming with the electronic device the displayed three-dimensional object by:
changing the displayed three-dimensional object from the first perspective to a second perspective based on a difference between the first position and the second position, wherein at least a portion of the changed three-dimensional object comprises a second reflective surface; and
mapping with the electronic device at least a portion of the captured second image on at least a portion of the second reflective surface;
concurrently displaying with the display:
the transformed three-dimensional object; and
a second depiction comprising the window and the element at a second element position within the window, wherein the second element position of the element with respect to the boundaries of the window is based on the detected second position of the user with respect to the component of the electronic device;
detecting that a position of the user within the field of view of the sensing mechanism has not changed more than a defined threshold amount within a specific period of time; and
removing any depiction of the window from the display when it has been detected that the position of the user within the field of view of the sensing mechanism has not changed more than the defined threshold amount within the specific period of time.

24. The method of claim 23, further comprising:
once the transformed three-dimensional object is displayed, capturing a third image of the environment with the sensing mechanism;
detecting with the electronic device a third position of the user with respect to the electronic device from the captured third image;
in response to detecting the third position, re-transforming with the electronic device the transformed three-dimensional object by:
re-changing the transformed three-dimensional object from the second perspective to a third perspective based on a difference between the second position and the third position, wherein at least a portion of the re-changed three-dimensional object comprises a third reflective surface; and
mapping with the electronic device at least a portion of the captured third image on at least a portion of the third reflective surface; and
displaying with the display the re-transformed three-dimensional object.

25. The method of claim 23, further comprising:
defining with the electronic device at least one optical property for each surface of a plurality of surfaces of the displayed three-dimensional object, wherein the mapping further comprises applying the at least a portion of the captured second image to at least one surface of the plurality of surfaces based on the defined optical properties.

26. The method of claim 25, wherein:
the at least one optical property comprises a reflection property; and
the mapping is based on the at least one reflection property.

27. The method of claim 25, wherein:
the at least one optical property comprises a reflection property; and
the mapping further comprises not applying the at least a portion of the captured second image to at least one other surface of the plurality of surfaces based on the reflection property for the at least one other surface.

28. The method of claim 23, further comprising updating with the electronic device the display of the three-dimensional object based on the mapped at least a portion of the captured second image.

29. The method of claim 23, wherein:
the captured second image comprises the user; and
the mapped at least a portion of the captured second image comprises at least a portion of a face of the user.

30. A method comprising:
capturing a first image of a user of an electronic device with a sensing mechanism of the electronic device;
detecting with the electronic device a first position of the user relative to the electronic device from the captured first image;
in response to detecting the detected first position, simultaneously displaying using a display of the electronic device:
at least one two-dimensional object from a first perspective, wherein the first perspective is based on the detected first position, and wherein the at least one two-dimensional object comprises at least one application window comprising a depth in the display that is different than another depth of another application window in the display;
at least one three-dimensional object from the first perspective, wherein the at least one three-dimensional object comprises an icon in a dock; and a first depiction comprising a window and an element at a first element position within the window, wherein the first element position of the element with respect to the boundaries of the window is based on the detected first position of the user relative to the electronic device;

capturing a second image of the user with the sensing mechanism of the electronic device;

detecting a second position of the user relative to the electronic device using the sensing mechanism of the electronic device, wherein the detected second position is different than the detected first position; and in response to detecting the detected second position, simultaneously displacing:
  the displayed at least one two-dimensional object from the first perspective to a second perspective using a first transform, wherein the second perspective is based on the detected second position;
  the displayed at least one three-dimensional object from the first perspective to the second perspective using a second transform; and
  a second depiction comprising the window and the element at a second element position within the window, wherein the second element position of the element with respect to the boundaries of the window is based on the detected second position of the user relative to the electronic device, and wherein the element comprises an intersection of crosshairs.

31. The method of claim 30, wherein:
the displayed at least one two-dimensional object comprises first metadata that associates the displayed at least one two-dimensional object with the first transform; and
the displayed at least one three-dimensional object comprises second metadata that associates the displayed at least one three-dimensional object with the second transform.

32. The method of claim 30, wherein:
the first transform comprises a parallax transform; and
the second transform comprises a perspective transform.

33. The method of claim 32, wherein:
the display comprises a front plane and a rear plane;
using the parallax transform comprises adjusting only the rear plane based on the detected second position; and
using the perspective transform comprises adjusting both of the rear plane and the front plane based on the detected second position.

34. The method of claim 30, wherein one of the displayed at least one three-dimensional object is displayed within one of the at least one application window.

35. The method of claim 30, wherein:
the displayed at least one two-dimensional object comprises first metadata that associates the displayed at least one two-dimensional object with the first transform;
the displayed at least one three-dimensional object comprises second metadata that associates the displayed at least one three-dimensional object with the second transform;
the first metadata is independent of the position of the displayed at least one two-dimensional object on the display; and
the second metadata is independent of the position of the displayed at least one three-dimensional object on the display.

36. A non-transitory machine-readable medium comprising machine program logic recorded thereon for:

directing with an electronic device a sensing mechanism of the electronic device to capture a first image of a user of the electronic device within a field of view of the sensing mechanism;

detecting with the electronic device a first position of the user with respect to a component of the electronic device from the captured first image;

in response to detecting the first position, concurrently displaying with the electronic device:
  a three-dimensional object from a first perspective, wherein at least a portion of the three-dimensional object from the first perspective comprises a first reflective surface and at least a portion of the captured first image is applied to at least a portion of the first reflective surface when the three-dimensional object from the first perspective is displayed; and
  a first depiction comprising a window and an element at a first element position within the window, wherein the first element position of the element with respect to the boundaries of the window is based on the detected first position of the user with respect to the component of the electronic device;

once the three-dimensional object is displayed from the first perspective, directing with the electronic device the sensing mechanism to capture a second image of the user within the field of view of the sensing mechanism;

detecting with the electronic device a second position of the user with respect to the component of the electronic device from the captured second image, wherein the detected second position is different than the detected first position;

in response to detecting the second position, transforming with the electronic device the displayed three-dimensional object by:
  changing the displayed three-dimensional object from the first perspective to a second perspective based on a difference between the first position and the second position, wherein at least a portion of the changed three-dimensional object comprises a second reflective surface; and
  applying at least a portion of the captured second image to at least a portion of the second reflective surface;

concurrently displaying with the electronic device:
  the transformed three-dimensional object; and
  a second depiction comprising the window and the element at a second element position within the window, wherein the second element position of the element with respect to the boundaries of the window is based on the detected second position of the user with respect to the component of the electronic device;

detecting that a position of the user within the field of view of the sensing mechanism has not changed more than a defined threshold amount within a specific period of time; and removing any depiction of the window from the display when it has been detected that the position of the user within the field of view of the sensing mechanism has not changed more than the defined threshold amount within the specific period of time.

37. The non-transitory machine-readable medium of claim 36, comprising additional machine program logic recorded thereon for:
after the displaying the transformed three-dimensional object, directing with the electronic device the sensing mechanism to capture a third image of the user;

detecting with the electronic device a third position of the user with respect to the electronic device from the captured third image;

in response to detecting the third position, re-transforming with the electronic device the transformed three-dimensional object by:

re-changing the transformed three-dimensional object from the second perspective to a third perspective based on a difference between the second position and the third position, wherein at least a portion of the re-changed three-dimensional object comprises a third reflective surface; and applying at least a portion of the captured third image to at least a portion of the third reflective surface; and displaying with the electronic device the re-transformed three-dimensional object.

38. The non-transitory machine-readable medium of claim 36, comprising additional machine program logic recorded thereon for:

displaying with the electronic device another three-dimensional object;

transforming with the electronic device the displayed another three-dimensional object based on the detected second position; and displaying with the electronic device the transformed another three-dimensional object.

39. The non-transitory machine-readable medium of claim 38, comprising additional machine program logic recorded thereon for:

transforming with the electronic device the displayed three-dimensional object by performing a first type of transform; and transforming with the electronic device the displayed another three-dimensional object by performing a second type of transform.

\* \* \* \* \*